(12) United States Patent
Yang et al.

(10) Patent No.: US 12,089,166 B2
(45) Date of Patent: Sep. 10, 2024

(54) REQUIREMENT RELATED TO COMMUNICATION OF WIRELESS COMMUNICATION DEVICE

(71) Applicant: LG ELECTRONICS INC., Seoul (KR)

(72) Inventors: Yoonoh Yang, Seoul (KR); Ilnam Cho, Seoul (KR); Sangwook Lee, Seoul (KR); Jinyup Hwang, Seoul (KR); Seungmin Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 310 days.

(21) Appl. No.: 17/595,432

(22) PCT Filed: Jul. 1, 2020

(86) PCT No.: PCT/KR2020/008605
§ 371 (c)(1),
(2) Date: Nov. 16, 2021

(87) PCT Pub. No.: WO2021/002678
PCT Pub. Date: Jan. 7, 2021

(65) Prior Publication Data
US 2022/0150844 A1    May 12, 2022

(30) Foreign Application Priority Data
Jul. 2, 2019   (KR) .................. 10-2019-0079542

(51) Int. Cl.
H04W 52/22    (2009.01)
H04W 4/40     (2018.01)
(Continued)

(52) U.S. Cl.
CPC .......... *H04W 52/221* (2013.01); *H04W 4/40* (2018.02); *H04W 52/14* (2013.01); *H04W 52/38* (2013.01)

(58) Field of Classification Search
CPC .............. H04W 72/23; H04W 52/146; H04W 72/0453; H04W 72/0446; H04W 52/367;
(Continued)

(56) References Cited

U.S. PATENT DOCUMENTS

| | | | |
|---|---|---|---|
| 2020/0064865 A1* | 2/2020 | Lei .................. | H04W 48/08 |
| 2020/0314930 A1* | 10/2020 | Cui .................. | H04W 76/16 |
| 2021/0232527 A1* | 7/2021 | Sweet, Jr. .......... | H01Q 25/002 |

(Continued)

FOREIGN PATENT DOCUMENTS

| | | |
|---|---|---|
| KR | 101413351 | 6/2014 |
| KR | 1020190065112 | 6/2019 |

OTHER PUBLICATIONS

Opportunities and Challenges of mmWave NR Aida Vera Lopez, Andrey Chervyakov, Greg Chance, Sumit Verma, and Yang Tang Intel Corporation, Apr. 2019.*
(Continued)

*Primary Examiner* — Golam Sorowar
(74) *Attorney, Agent, or Firm* — LEE, HONG, DEGERMAN, KANG & WAIMEY

(57) ABSTRACT

Provided in one embodiment of the present specification is a wireless communication device. The wireless communication device can comprise a transceiver, a memory for storing a command, and a processor. An operation performed on the basis of the execution of the command by the processor can comprise the steps of: determining transmission power; and controlling the at least one transceiver so as to transmit, on the basis of the transmission power, an uplink signal in an operating band including 39 GHz.

13 Claims, 17 Drawing Sheets

(51) Int. Cl.
*H04W 52/14* (2009.01)
*H04W 52/38* (2009.01)

(58) Field of Classification Search
CPC .............. H04W 72/21; H04W 52/242; H04W 72/1268; H04W 76/27; H04W 52/42; H04W 74/0808; H04W 88/08; H04W 72/20; H04W 74/0833; H04W 56/001; H04W 88/02; H04W 16/14; H04W 72/044; H04W 74/006; H04W 4/70; H04W 52/08; H04W 24/10; H04W 72/046; H04W 52/245; H04W 52/325; H04W 56/0015; H04W 16/28; H04W 24/08; H04L 5/0053; H04L 5/0048; H04L 5/0007; H04L 5/0094; H04L 5/0051; H04L 5/001; H04L 5/0023; H04L 5/0044; H04L 1/1812; H04L 5/1469; H04L 5/0091; H04L 5/0092; H04L 1/0026; H04L 1/1887; H04L 1/1822; H04L 1/1864; H04L 27/0006; H04L 1/1819; H04L 27/2602

See application file for complete search history.

(56) References Cited

U.S. PATENT DOCUMENTS

2022/0271816 A1* 8/2022 Alijan ................. H04B 1/0475
2023/0362583 A1* 11/2023 Rahman ............... H04W 4/021

OTHER PUBLICATIONS

3GPP; TSG RAN; NR; User Equipment (UE) radio transmission and reception; Part 2: Range 2 Standalone (Release 15). 3GPP TS 38.101-2 V15.5.0. Apr. 4, 2019.*
PCT International Application No. PCT/KR2020/008605, International Search Report dated Sep. 22, 2020, 4 pages.
Lopez, et al., "Opportunities and Challenges of mmWave NR," IEEE Wireless Communications, vol. 26, Issue: 2, Apr. 2019, 3 pages.
3rd Generation Partnership Project (3GPP), "Technical Specification Group Radio Access Network; NR; User Equipment (UE) radio transmission and reception; Part 2: Range 2 Standalone (Release 15)," 3GPP TS 38.101-2 V15.5.0, Mar. 2019, 142 pages.
Sano et al., "5G Radio Performance and Radio Resource Management Specifications," NTT Docomo Technical Journal vol. 20, No. 3, Jan. 2019, 17 pages.

* cited by examiner

REQUIREMENT RELATED TO COMMUNICATION OF WIRELESS COMMUNICATION DEVICE

CROSS-REFERENCE TO RELATED APPLICATIONS

This application is the National Stage filing under 35 U.S.C. 371 of International Application No. PCT/KR2020/008605, filed on Jul. 1, 2020, which claims the benefit of earlier filing date and right of priority to Korean Patent Application No. 10-2019-0079542, filed on Jul. 2, 2019, the contents of which are all incorporated by reference herein in their entirety.

TECHNICAL FIELD

The present disclosure generally relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

In 5G, an RF standard (or requirement) for a power class of a terminal according to an operating band is defined. Conventionally, for a vehicle (vehicular) terminal corresponding to power class 2, the RF standard was defined only for the operating band (eg, n257, n258, n261) including 28 GHz, but for the operating band (n260) including 39 GHz, the RF standard is not defined.

Therefore, there is a problem that the RF standard of the vehicular terminal capable of performing communication in the operating band (n260) including 39 GHz is not clear.

SUMMARY

Accordingly, a disclosure of the present specification has been made in an effort to solve the aforementioned problem.

In order to solve the above problems, one disclosure of the present specification provides a wireless communication device. A wireless communication device includes a transceiver; memory to store instructions; and a processor. The operations performed based on the execution of the instruction by the processor may include: determining transmission power; and controlling the at least one transceiver to transmit an uplink signal in an operating band including 39 GHz based on the transmission power.

In order to solve the above problems, one disclosure of the present specification provides a wireless communication device. A wireless communication device includes a transceiver; memory to store instructions; and a processor. The operation performed based on the instruction being executed by the processor includes: controlling the at least one transceiver to receive a downlink signal in an operating band including 39 GHz, and receiving the downlink signal. The reference sensitivity related to reception of the downlink signal, and/or the EIS related to reception of the downlink signal may be predetermined based on a channel bandwidth.

In order to solve the above problems, one disclosure of the present specification provides an apparatus (apparatus) in mobile communication. The apparatus includes at least one processor; and at least one memory to store instructions and operably electrically connectable with the at least one processor, wherein the operations performed based on the instructions being executed by the at least one processor include: determining transmission power; and generating an uplink signal in an operating band including 39 GHz based on the transmission power.

In order to solve the above problems, one disclosure of the present specification provides a non-volatile computer-readable storage medium recording instructions. The instructions, when executed by one or more processors, cause the one or more processors to: determine transmission power; and generating an uplink signal in an operating band including 39 GHz based on the transmission power.

Accordingly, a disclosure of the present specification has been made in an effort to solve the aforementioned problem.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

DESCRIPTION OF EXEMPLARY EMBODIMENTS

Figure 1:
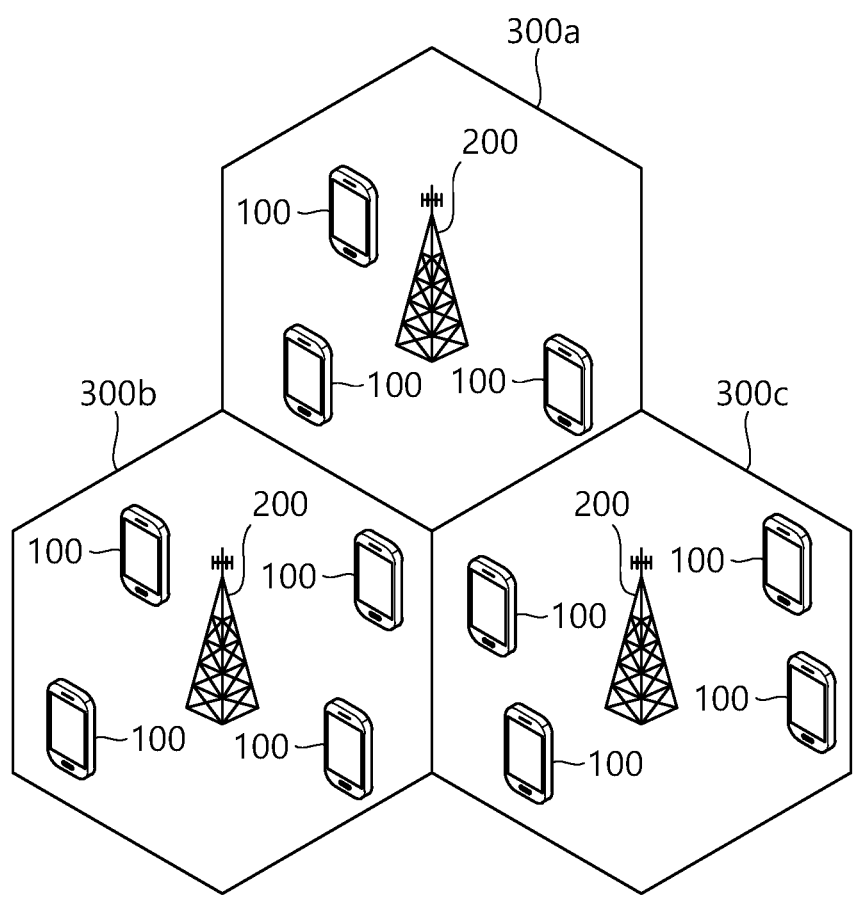
FIG. 1 illustrates a wireless communication system.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point) and gNB (Next generation NodeB).

I. Techniques and Procedures Applicable to the Disclosure of the Present Specification FIG. 1 Illustrates a Wireless Communication System.

As seen with reference to FIG. 1, the wireless communication system includes at least one base station (BS) 200. Each base station 200 provides a communication service to specific geographical areas (generally, referred to as cells) 300a, 300b, and 300c. The cell can be further divided into a plurality of areas (sectors).

The UE 100 generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 200 to the UE 100 and an uplink means communication from the UE 100 to the base station 200. In the downlink, a transmitter may be a part of the base station 200 and a receiver may be a part of the UE 100. In the uplink, the transmitter may be a part of the UE 100 and the receiver may be a part of the base station 200.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

<Next-Generation Mobile Communication Network>

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2020.

ITU proposes three usage scenarios, for example, enhanced Mobile Broad Band (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wide-band.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

Figure 2A:
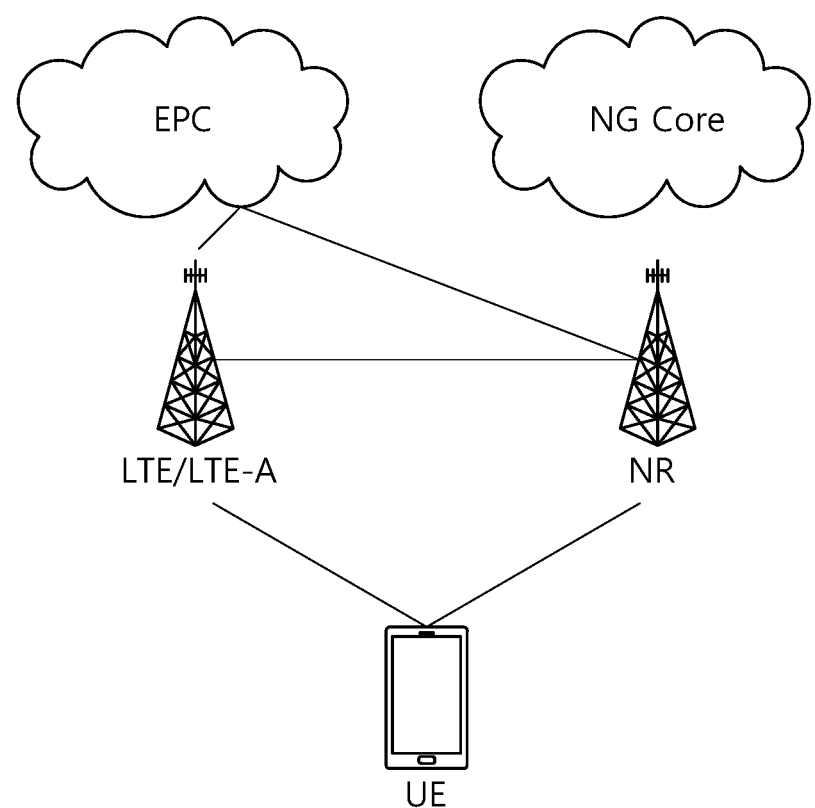
FIGS. 2*a* to 2*c* are exemplary diagrams illustrating an exemplary architecture for a service for next-generation mobile communication.
Figure 2B:
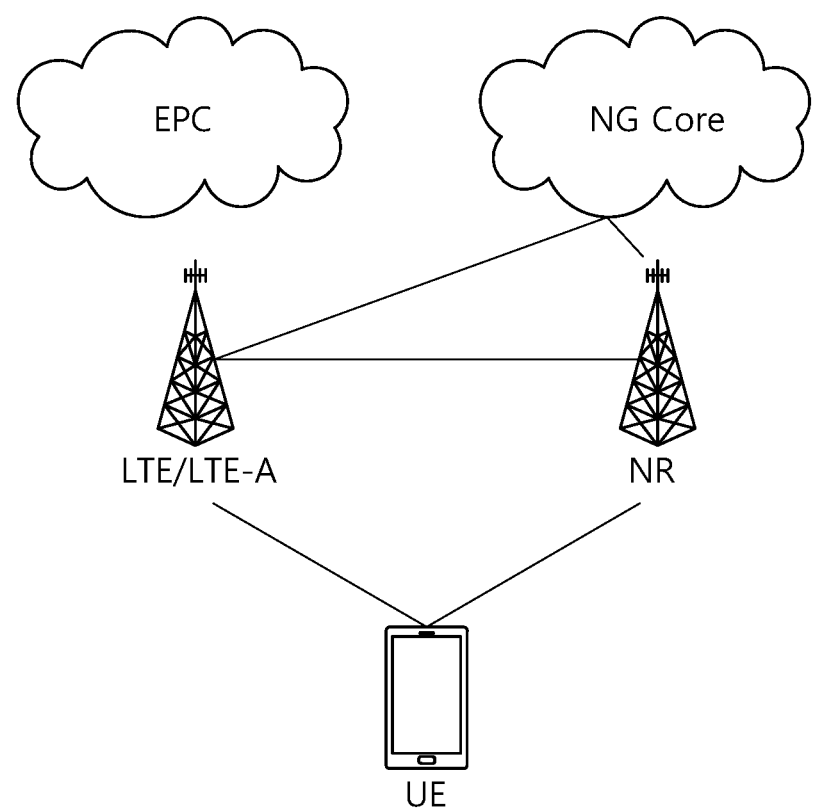
Figure 2C:
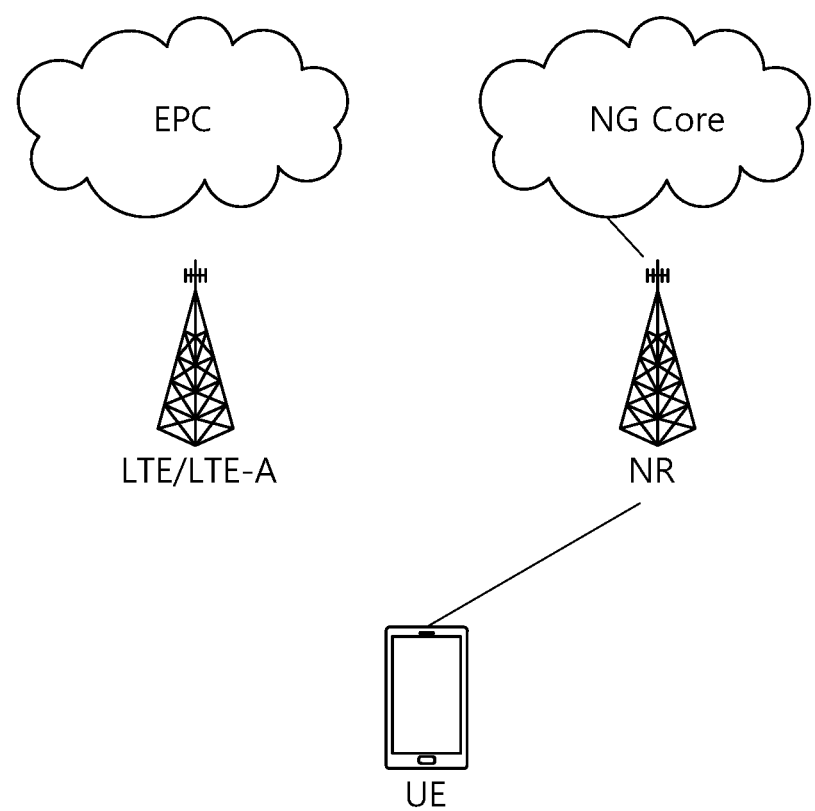

FIGS. 2a to 2c are Exemplary Diagrams Illustrating Exemplary Architectures for Services of the Next Generation Mobile Communication.

Referring to FIG. 2a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 2b, unlike FIG. 2a, the LTE/LTE-A based cell is connected to a core network for the 5G mobile communication, that is, a next generation (NG) core network.

The service scheme based on the architecture as illustrated in FIGS. 2a and 2B is called non-standalone (NSA).

Referring to FIG. 2c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

Figure 3:
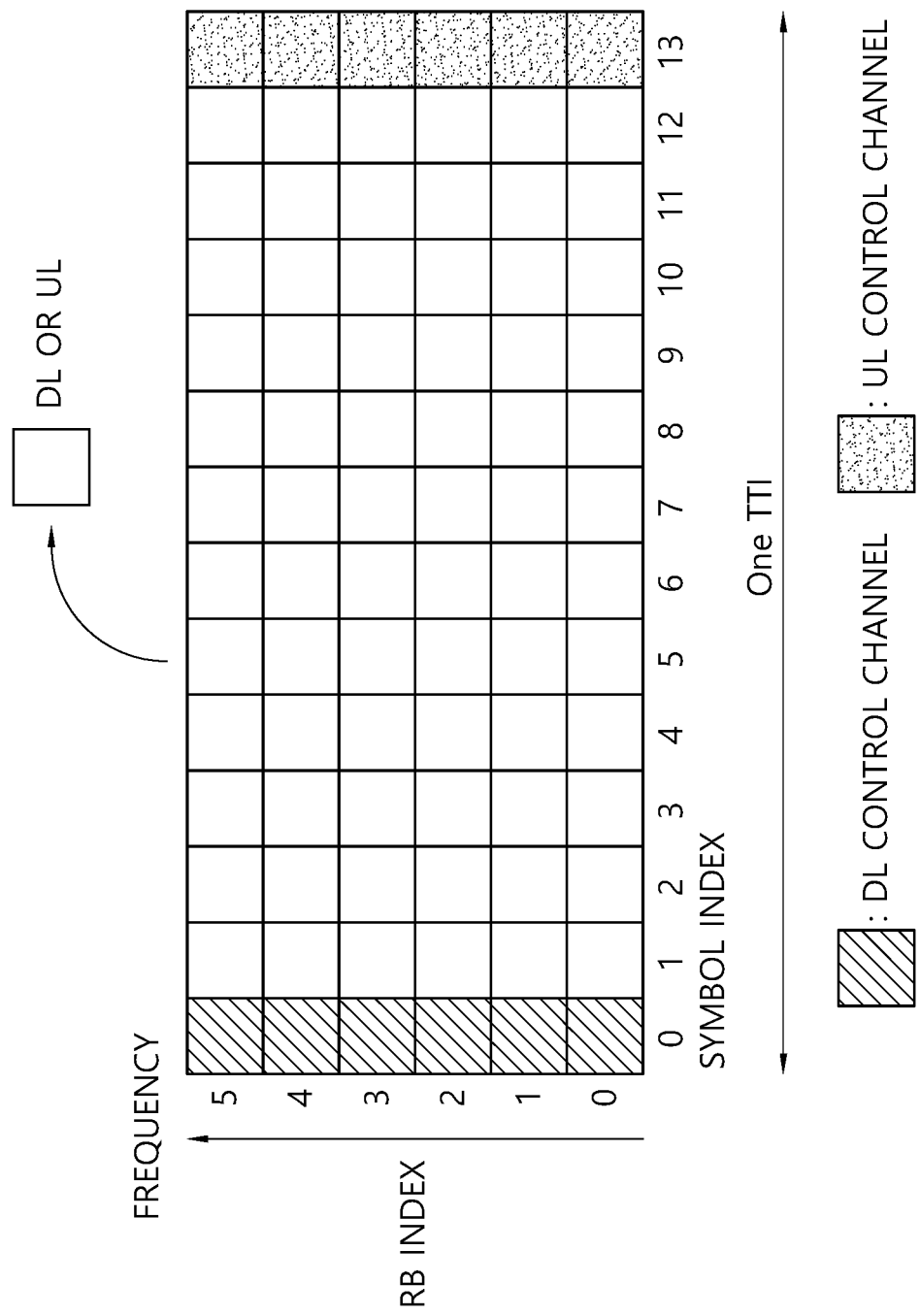
FIG. 3 shows an example of subframe type in NR.

FIG. 3 Shows an Example of Subframe Type in NR.

A transmission time interval (TTI) shown in FIG. 3 may be called a subframe or slot for NR (or new RAT). The subframe (or slot) in FIG. 3 may be used in a TDD system of NR (or new RAT) to minimize data transmission delay. As shown in FIG. 3, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

The NR supports a plurality of numerologies (e.g. a plurality of values of subcarrier spacing (SCS)) in order to support various 5G services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.
<Operating Band in NR>

An NR frequency band may be defined as two types (FR1 and FR2) of frequency ranges. The frequency ranges may be changed. For example, the two types (FR1 and FR2) of frequency bands are illustrated in Table 1. For the convenience of description, among the frequency bands used in the NR system, FR1 may refer to a "sub-6-GHz range", FR2 may refer to an "above-6-GHz range" and may be referred to as a millimeter wave (mmWave).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the frequency ranges for the NR system may be changed. For example, FR1 may include a range from 410 MHz to 7125 MHz as illustrated in Table 3. That is, FR1 may include a frequency band of 6 GHz or greater (or 5850, 5900, 5925 MHz, or the like). For example, the frequency band of 6 GHz or greater (or 5850, 5900, 5925 MHz or the like) included in FR1 may include an unlicensed band. The unlicensed band may be used for various uses, for example, for vehicular communication (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 4:
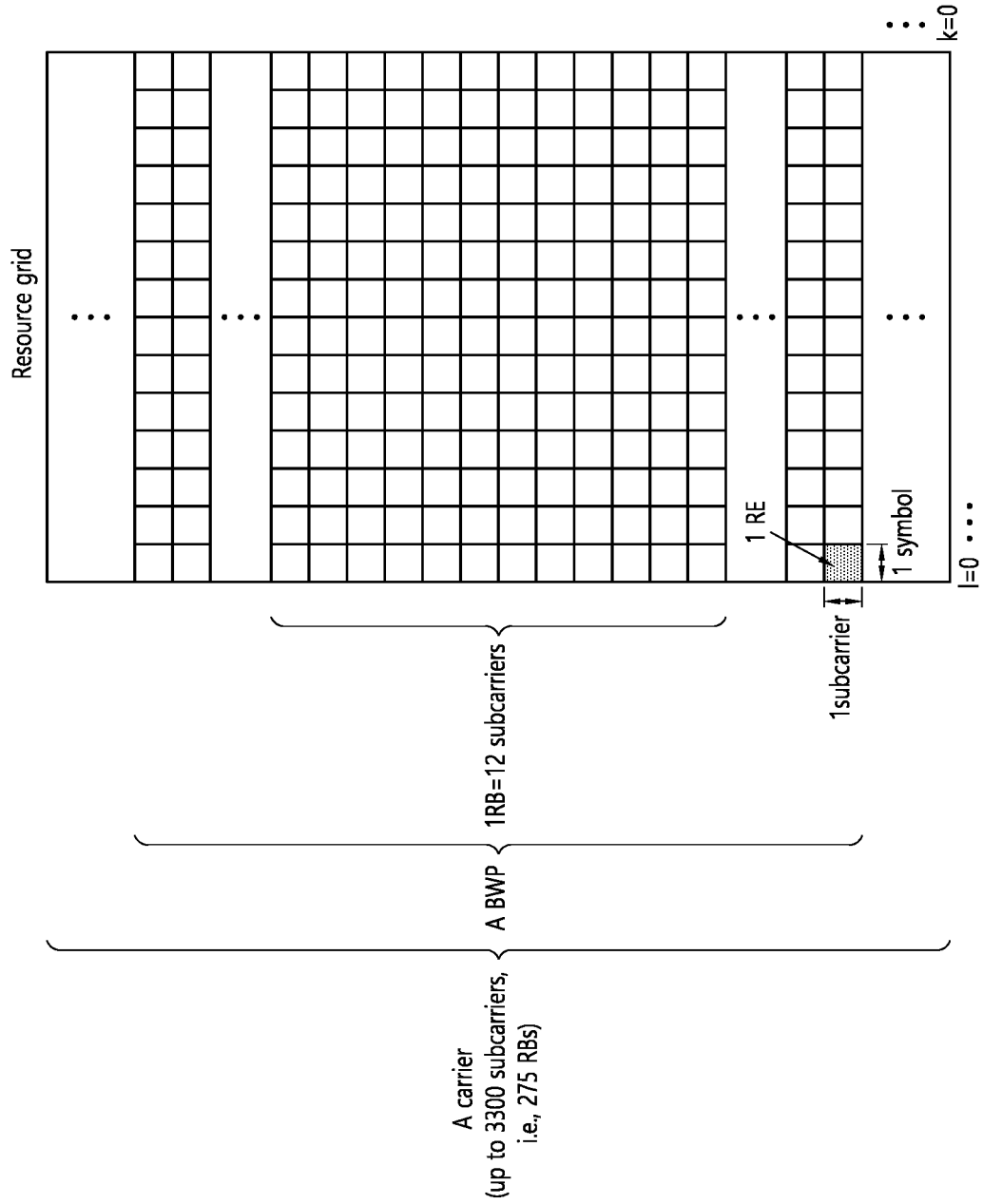
FIG. 4 illustrates the slot structure of an NR frame.

FIG. 4 Illustrates the Slot Structure of an NR Frame.

The structure shown in FIG. 4 is an example of a slot structure of an NR frame. A slot includes a plurality of symbols in the time domain. For example, in the case of a normal CP, one slot includes 7 symbols, but in the case of an extended CP, one slot includes 6 symbols. The carrier includes a plurality of subcarriers in the frequency domain. A resource block (RB) is defined as a plurality of (eg, 12) consecutive subcarriers in the frequency domain. A bandwidth part (BWP) is defined as a plurality of consecutive (P)RBs in the frequency domain, and may correspond to one numerology (eg, SCS, CP length, etc.). A carrier may include a maximum of N (eg, 5) BWPs. Data communication is performed through the activated BWP, and only one BWP can be activated for one terminal. Each element in the resource grid is referred to as a resource element (RE), and one complex symbol may be mapped.
<Bandwidth Part: BWP>

A wideband frequency maximally reaching 400 MHz may be used in NR. A new concept of BWP was introduced in NR to enable various UEs to efficiently distribute and use a frequency band.

When UEs transmit the information about their abilities to a base station while performing initial access, the base station may configure a BWP to be used by the UEs to the UEs and may transmit the information about the configured BWP to the UE. Accordingly, downlink and uplink data transmission and reception between the UEs and the base station are performed only through the BWP configured in the UEs. That is, configuring the BWP in the UEs by the base station is to instruct the UEs not to use frequency bands other than the BWP when performing wireless communication with the base station later.

The base station may configure the entire band of the carrier frequency reaching 400 MHz as the BWP for the UEs or may configure only some bands as the BWP for the UEs. Further, the base station may configure several BWPs for one UE. When several BWPs are configured for one UE, the frequency bands of the BWPs may overlap each other or not.
<SS Block in NR>

In the 5G NR, information required for a UE to perform an initial access, that is, a Physical Broadcast Channel (PBCH) including a Master Information Block (MIB) and a synchronization signal (SS) (including PSS and SSS) are defined as an SS block. In addition, a plurality of SS blocks may be grouped and defined as an SS burst, and a plurality of SS bursts may be grouped and defined as an SS burst set. It is assumed that each SS block is beamformed in a particular direction, and various SS blocks existing in an SS burst set are designed to support UEs existing in different directions.

Figure 5:
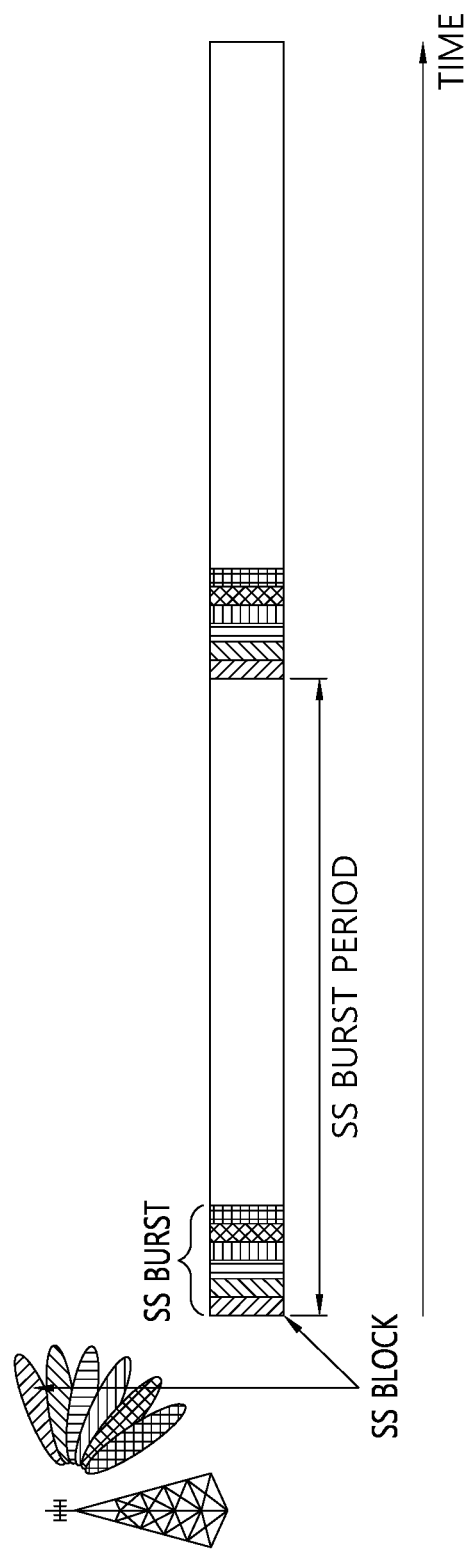
FIG. 5 is a diagram illustrating an example of an SS block in NR.

FIG. 5 is a Diagram Illustrating an Example of an SS Block in NR.

Referring to FIG. 5, an SS burst is transmitted in every predetermined periodicity. Accordingly, a UE receives SS blocks, and performs cell detection and measurement.

Meanwhile, in the 5G NR, beam sweeping is performed on an SS. A detailed description thereof will be provided with reference to FIG. 6.

Figure 6:
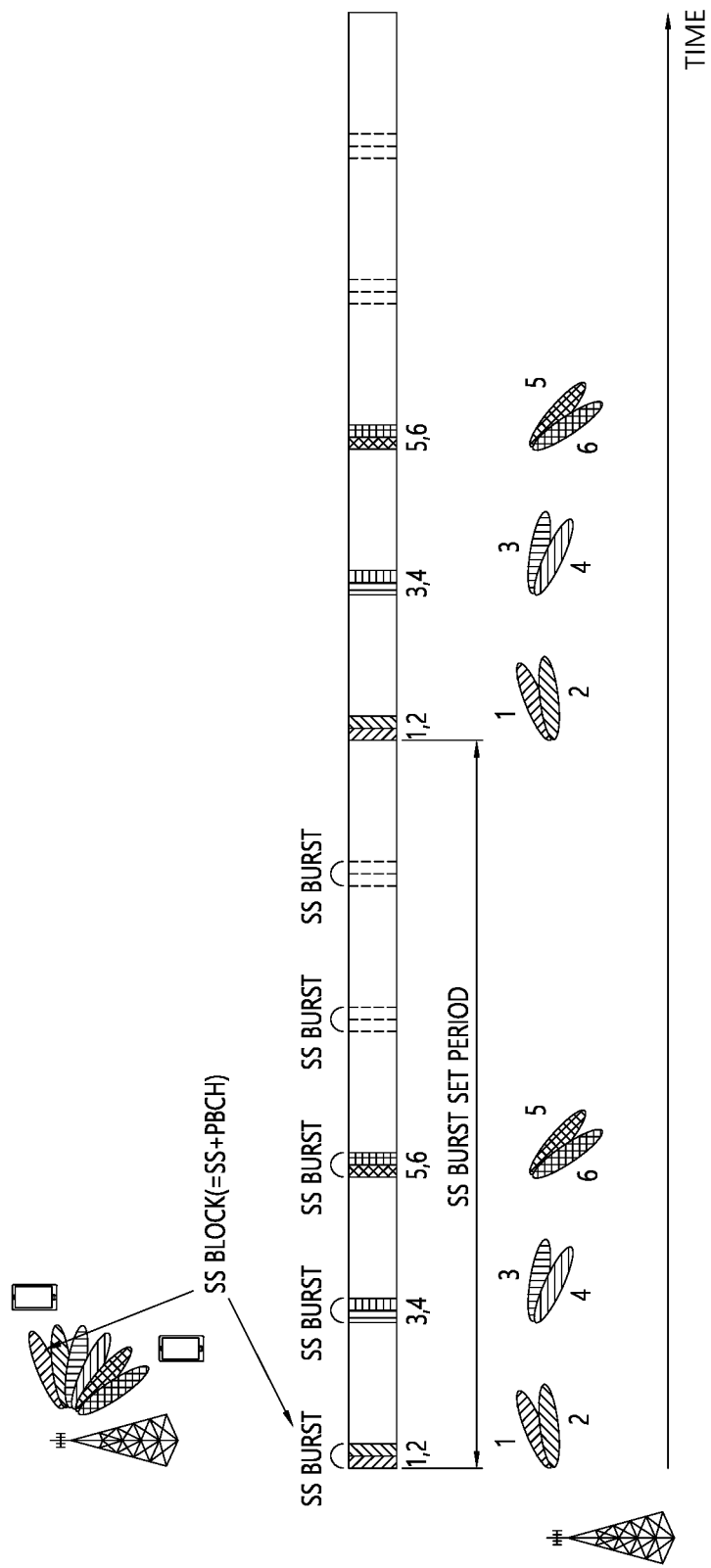
FIG. 6 is a diagram illustrating an example of beam sweeping in the NR.

FIG. 6 is a Diagram Illustrating an Example of Beam Sweeping in the NR.

A base station transmits each SS block in an SS burst over time while performing beam sweeping. In this case, multiple SS blocks in an SS burst set are transmitted to support UEs existing in different directions. In FIG. 5, the SS burst set includes one to six SS blocks, and each SS burst includes two SS blocks.

II. Disclosure of the Present Specification

The disclosures described below in this specification may be implemented in one or more combinations. Each of the drawings shows an embodiment of each disclosure, but the embodiments of the drawings may be implemented in combination with each other.

Hereinafter, a radio frequency (RF) standard of a terminal (eg, a 5G NR vehicular terminal) performing communication in an operating band including 39 GHz will be described. A radio frequency (RF) standard of a terminal (eg, a 5G NR vehicular (vehicular) terminal) performing communication in an operating band including 39 GHz is not defined in the conventional standard specification.

For example, the RF standard may include transmit power requirements and/or receive requirements (eg, reference sensitivity, EIS). Here, EIS stands for Effective Isotropic Sensitivity. Reference sensitivity is also called REFSENS.

For reference, UE RF requirements of 5G NR mmWave band (ie, FR 2 band) may be defined in consideration of four power classes. Table 3 below shows the assumed UE type for each power class.

TABLE 3

| UE Power class | UE type |
| --- | --- |
| 1 | Fixed wireless access (FWA) UE |
| 2 | Vehicular UE |

TABLE 3-continued

| UE Power class | UE type |
| --- | --- |
| 3 | Handheld UE |
| 4 | High power non-handheld UE |

The operating band including 39 GHz as described above may be band n260. Table 4 shows an example of the NR operating band of FR2.

TABLE 4

| Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
| --- | --- | --- | --- |
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |

In Table 4, an operating band may mean an operating band. The operating band may mean a frequency band in which communication may be performed.

The UL operating band may mean an uplink operating band. The uplink operating band may mean a frequency range of an operating band in which a base station (BS) receives a signal and a terminal (eg, UE) transmits a signal. $F_{UL\_low}$ may mean the smallest frequency that can be used for the uplink operating band in each operating band, and $F_{UL\_high}$ may mean the largest frequency that can be used for the uplink operating band in each operating band.

The DL operating band may mean a downlink operating band. The downlink operating band may mean a frequency range of an operating band in which a base station (BS) transmits a signal and a terminal (eg, UE) receives a signal. $F_{DL\_low}$ may mean the smallest frequency that can be used for the downlink operating band in each operating band, and $F_{DL\_high}$ may mean the largest frequency that can be used for the downlink operating band in each operating band.

Referring to Table 4, it can be seen that the operating band including 39 GHz is n260. The uplink operating band of the operating band n260 may be 37000 MHz to 40000 MHz, and the downlink operating band may be 37000 MHz to 40000 MHz.

Conventionally, for a 5G NR vehicle (vehicular) terminal, the RF standard is defined only for the operating band (eg, n257, n258, n261) including 28 GHz, but for the operating band (n260) including 39 GHz, the RF standard is not defined.

For 5G NR V2X, discussion will proceed as the 3GPP standard includes both FR2 (mmWave) frequency bands (eg, an operating band that includes 28 GHz and an operating band that includes 39 GHz). Accordingly, the RF standard of the operating band including 39 GHz for the FR2 vehicular UE needs to be defined.

The RF standard of the FR2 vehicular terminal for the operating band including 39 GHz may be different from the RF standard of the FR2 vehicular terminal for the operating band including 28 GHz. This is because the antenna characteristics of the terminal may be different depending on the frequency, and Noise Figure and implementation loss may be different.

Hereinafter, an RF standard of a vehicular terminal operating in an operating band including 39 GHz is proposed in consideration of the antenna characteristics and RF characteristics of the operating band including 39 GHz. The RF standard may include requirements related to transmission power of the UE and/or requirements related to reception of the UE (eg, reference sensitivity, EIS).

1. Requirements Related to Transmit Power

The requirements related to RF Tx (transmission) power of a vehicular terminal performing communication in an operating band (eg, n260) including 39 GHz are described. For reference, the transmission power-related requirement may be applied to the transmission power when the terminal transmits an uplink signal, and may also be applied to the transmission power when the terminal transmits a sidelink signal.

The requirements related to the transmit power (Tx power) of the FR2 (mmWave) terminal may include at least one or more of the following four types. For example, the requirements related to the transmit power (Tx power) of the FR2 (mmWave) terminal may include all of the following four.

Minimum peak EIRP (dBm)

EIRP at spherical coverage of [X]%-tile ($X^{th}$ percentile) CDF (cumulative distribution function) (dBm)

Maximum TRP (dBm)

Maximum EIRP (dBm)

dBm may mean decibels with reference to one milliwatt.

In the operating band including 39 GHz, the Minimum peak EIRP value of the vehicular terminal is 25 dBm to 26 dBm in consideration of the antenna characteristics and RF implementation parameters of the terminal in the operating band including 39 GHz. As an example, 26 dBm is proposed as the Minimum peak EIRP value. Table 5 below shows examples of antenna characteristics and RF implementation parameters of a terminal in an operating band n260 including 39 GHz.

TABLE 5

| parameter | unit | Frequency rage 37 GHz~40 GHz |
| --- | --- | --- |
| Pout per element | dBm | 12 |
| # (number) of antennas in array | | 8 |
| Total conducted power per polarization | dBm | 21 |
| Avg. antenna element gain | dBi | 3.5 |
| Antenna roll-off loss vs frequency | dB | −1.5 |
| Realized antenna array gain | dBi | 11.0 |
| Polarization gain | dB | 2.5 |
| Total implementation loss (worst-case) | dB | −9.5~−8.5 |
| Peak EIRP (Minimum) | dBm | 25~26 |

In Table 5, Pout per element may mean an output of power amplifier of one antenna element. The antenna element may include polarization antennas (H-pole and V-pole). In H-pole, H may mean Horizontal and V may mean Vertical.

Total conducted power per polarization may mean a total conducted power per polarization. Avg. antenna element gain may mean an average value of the antenna element gains. Realized antenna array gain may mean the gain of the actually implemented antenna array considering both the antenna roll-off loss in the antenna array gain derived from the average antenna element gain and the number of used antenna elements. The polarization gain may mean a polarization gain. Total implementation loss (worst-case) may mean total implementation loss in a worst case.

For reference, the total conducted power per polarization may be determined based on Equation 1.

Total conducted power per polarization = $P_{out}$ per element [Equation 1]

$+10 * \log_{10}$(#(number) of antennas in array)

In Table 5, Pout per element is 12 dBm, and # (number) of antennas in array is 8. Since $12+10*\log_{10}(8)=21.03$, Total conducted power per polarization can be 21 rounded up to the second decimal place of 21.03.

For reference, the realized antenna array gain may be determined based on Equation 2.

Realized antenna array gain = Avg. antenna element gain + [Equation 2]

$10 * \log_{10}$(#(number) of antennas in array)

+Antenna roll−off loss vs frequency

In Table 5, Avg. Antenna element gain is 3.5 dBi, # (number) of antennas in array is 8, and antenna roll-off loss vs frequency is −1.5 dB. Since $3.5+10*\log_{10}(8)-1.5=11.03$, the Realized antenna array gain may be 11.0 dBi rounded off by 11.03 to the second decimal place.

Peak EIRP (Minimum) may mean the Minimum peak EIRP value of the vehicular terminal in the operating band including 39 GHz determined in consideration of the antenna characteristics and RF implementation parameters of the terminal in the operating band including 39 GHz. Peak EIRP (Minimum) may be determined based on Equation 3.

Peak $EIRP$ = Total conducted power per polarization + [Equation 3]

Realized antenna array gain +

Polarization gain + Total implementation loss

In Table 5, Total conducted power per polarization is 21 dBm, Realized antenna array gain is 11.0 dBi, and Total implementation loss is −9.5 dB to −8.5 dB. Therefore, since 21+11−(9.5−8.5)=25−26, the Peak EIRP (Minimum) may be 25 dBm to 26 dBm.

For the spherical coverage EIRP of the vehicular terminal performing communication in the operating band including 39 GHz, the [X]%-tile ($X^{th}$ percentile) value of the CDF may be used. Here, in the prior art, the value of X was not determined.

For reference, the spherical coverage EIRP of a vehicular terminal performing communication in an operating band (eg, n257, n258, n261) including 28 GHz uses a 60%-tile (60th percentile) value of the CDF.

For spherical coverage EIRP of a vehicular terminal (hereinafter, also briefly described as "39 GHz vehicular terminal") performing communication in an operating band including 39 GHz, it is proposed to equally apply the CDF 60%-tile (60th percentile), which is the spherical coverage criterion of a vehicular terminal performing communication in an operating band including 28 GHz (hereinafter, also briefly described as "29 GHz vehicular terminal"). This is because both the vehicular terminal performing communication in the operating band including 28 GHz and the vehicular terminal performing communication in the operating band including 39 GHz are terminals corresponding to power class 2. Since the CDF related to the EIRP of the 39 GHz vehicular terminal and the CDF related to the EIRP of the 28 GHz vehicular terminal are different, the EIRP value corresponding to the CDF 60%-tile of the 39 GHz vehicular terminal is the EIRP value corresponding to the CDF 60%-tile of the 28 GHz vehicular terminal may be different.

Figure 7:
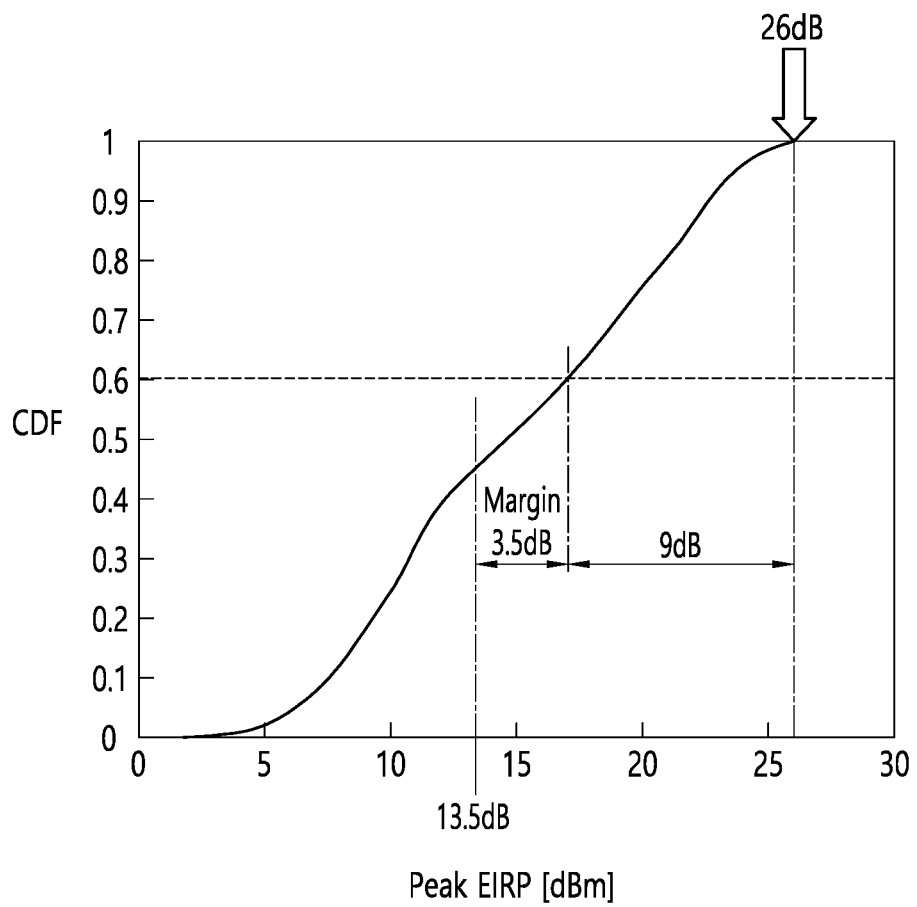
FIG. 7 shows the peak EIRP CDF of the vehicular terminal in the operating band including 39 GHz.

The EIRP CDF of the vehicular terminal is determined in consideration of the antenna characteristics and RF characteristics in the operating band including 39 GHz. For example, the peak EIRP CDF of the vehicular terminal may be determined based on the simulation considering the antenna characteristics and the RF characteristics in the operating band including 39 GHz. FIG. 7 shows an example of a peak EIRP CDF of a vehicular terminal in an operating band including 39 GHz. For reference, the antenna characteristic and the RF characteristic may be characteristics based on the parameters of Table 5. For example, when considering the antenna characteristics, Avg. Antenna element gain, antenna roll-off loss vs frequency and polarization gain can be considered. For example, when considering RF characteristics, Pout per element, Total implementation loss may be considered.

FIG. 7 Shows the Peak EIRP CDF of the Vehicular Terminal in the Operating Band Including 39 GHz.

FIG. 7 shows the peak EIRP CDF of the vehicular terminal determined in consideration of the antenna characteristics and RF characteristics in the operating band including 39 GHz.

Refer to FIG. 7, the peak EIRP value corresponding to 100%-tile (100th percentile) in the peak EIRP CDF is 26 dBm.

Considering the antenna characteristics and RF characteristics in the operating band including 39 GHz, the EIRP value corresponding to 60%-tile can be derived from the peak EIRP CDF. And, it is possible to determine the EIRP value corresponding to the spherical coverage 60%-tile CDF in consideration of the implementation margin in the derived EIRP value.

For example, referring to FIG. 7, the peak EIRP value corresponding to 60%-tile (60th percentile) in the peak EIRP CDF may be 17 dBm, which is 9 dB smaller than 26 dBm. For the implementation margin, a value of 3.5 dB to 4.5 dB may be used. For example, an implementation margin of 3.5 dB is shown in FIG. 7.

Considering the EIRP value of 17 dBm and the implementation margin (3.5 dB to 4.5 dB) corresponding to the 60%-tile derived from the peak EIRP CDF, 12.5 dBm to 13.5 dBm is proposed as the EIRP value corresponding to the spherical coverage 60%-tile CDF. For example, since 17 dBm−3.5 dB=13.5 dBm, 13.5 dBm is proposed as an EIRP value corresponding to a spherical coverage 60%-tile CDF.

For the Maximum TRP and Maximum EIRP of the vehicular terminal performing communication in the operating band including 39 GHz, it is suggested to use the same value as the Maximum TRP and Maximum EIRP applied to the vehicular terminal performing communication in the operating band including 28 GHz. This is because the Maximum TRP and Maximum EIRP are values defined in the Federal Communications Commission (FCC) regulation, and are the same in the operating band including 39 GHz and the operating band including 28 GHz.

The Maximum TRP of the vehicular terminal performing communication in the operating band including 28 GHz is 23 dBm, and the Maximum EIRP is 43 dBm. Therefore, the Maximum TRP of the vehicular terminal performing communication in the operating band including 39 GHz is 23 dBm, the Maximum EIRP may be 43 dBm.

An example that summarizes the requirements related to the transmission power of the vehicular terminal performing communication in the operating band including 39 GHz is as follows.

The minimum peak EIRP of the vehicular terminal of the operating band including 39 GHz may be 25 to 26 dBm. As an example, 26 dBm is proposed as the minimum peak EIRP of the vehicular terminal of the operating band.

The spherical coverage EIRP of the vehicular terminal of the operating band including 39 GHz may be 12.5 dBm to 13.5 dBm based on the 60%-tile (60th percentile) of the spherical coverage CDF. As an example, 13.5 dBm is proposed as the spherical coverage EIRP of the vehicular terminal.

The maximum total radiated power (TRP) of the vehicular terminal of the operating band including 39 GHz may be 23 dBm. The maximum EIRP of the vehicular terminal of the operating band including 39 GHz may be 43 dBm.

A vehicular terminal capable of performing communication in an operating band (eg, n260) including 39 GHz may satisfy transmission power-related requirements.

For example, when a terminal transmits a signal, a transceiver and/or a processor may be implemented to satisfy a requirement related to transmission power. For example, when the transceiver of the terminal transmits a signal, the transceiver may be implemented such that the transmit power of the transceiver meets the above-described transmit power-related requirements. As another example, when the processor of the terminal controls the transceiver of the terminal to transmit a signal, the processor and the transceiver may be implemented such that the transmit power of the transceiver satisfies the above-described transmit power-related requirements. Here, the signal transmitted by the terminal may be an uplink signal transmitted to the base station. In addition, the signal transmitted by the terminal may be a sidelink signal transmitted to another terminal.

The peak EIRP value of a vehicular terminal capable of performing communication in an operating band including 39 GHz (eg, n260) must be greater than or equal to the minimum peak EIRP value (25 dBm to 26 dBm).

When a vehicular terminal capable of performing communication in an operating band (eg, n260) including 39 GHz transmits a signal, when the CDF is calculated by measuring the EIRP of the terminal in the full sphere around the terminal, The EIRP value corresponding to 60%-tile the CDF is must be higher than the EIRP at spherical coverage of 60%-tile CDF (12.5 dBm~13.5 dBm) described above.

When a vehicular terminal capable of performing communication in an operating band (eg, n260) including 39 GHz transmits a signal, the TRP of the terminal must be less than or equal to the Maximum TRP (23 dBm). When a vehicular terminal capable of performing communication in an operating band including 39 GHz (eg, n260) transmits a signal, the EIRP of the terminal must be less than or equal to the Maximum EIRP (43 dBm).

2. Requirements Related to Reception

The requirements related to Rx (reception) of a vehicular terminal performing communication in an operating band (eg, n260) including 39 GHz are described. For reference, the requirements related to reception may be applied to the reception of a downlink signal of the terminal and may also be applied to reception of a sidelink signal of the terminal.

Reception (Rx)-related standards (eg, Rx power standards) of terminals performing communication in the FR2 (mmWave) operating band may include, for example, reference sensitivity (REFSENS), which is reception sensitivity standards, and Effective Isotropic Sensitivity (EIS).

First, REFSENS will be described.

REFSENS is determined based on Thermal Noise (dBm/Hz), RX Channel Bandwidth (RX Channel BW), Noise Figure (NF), Antenna Gain, Diversity Gain, Signal-to-Noise Ratio (SNR) and Implementation Loss (ILs). For example, REFSENS may be determined based on Equation 4 below.

$$REFSENS = -174 \text{ dBm/Hz} + 10*\log_{10}(\text{Max. } Rx \text{ } BW) + \text{ [Equation 4]}$$
$$NF - \text{Total Ant. gain} - \text{diversity gain} + SNR + ILs$$

In Equation 4, −174 dBm/Hz means thermal noise. Max.Rx BW is the Maximum Rx bandwidth and means the maximum reception bandwidth. Max.Rx BW may be determined based on the channel bandwidth. NF stands for Noise Figure. Total Ant. gain means the total antenna gain. diversity gain is diversity gain. SNR is the signal-to-noise ratio and means the signal-to-noise ratio. ILs stands for Implementation Loss.

Max.Rx BW can be derived based on, for example, Subcarrier Spacing (SCS) 120 kHz (SCS that can be used in the FR2 band) and the maximum number of Resource Blocks (RBs) allocated to the FR2 channel bandwidth (eg 50 MHz, 100 MHz, 200 Mhz and 400 MHz). Table 6 below shows an example of the number of RBs ($N_{RB}$) based on the SCS value and the channel bandwidth.

TABLE 6

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

Referring to Table 6, when SCS is 120 kHz, $N_{RB}$ is 32 in 50 MHz channel bandwidth, $N_{RB}$ is 66 in 100 MHz channel bandwidth, $N_{RB}$ is 132 in 200 MHz channel bandwidth, and $N_{RB}$ is 264 in 400 MHz channel bandwidth. Max.Rx BW can be derived using FR2 channel bandwidth−guardband*2. Table 7 below shows an example of the minimum guardband according to the FR2 channel bandwidth and SCS.

TABLE 7

| SCS (kHz) | 50 MHz | 100 MHz | 200 MHz | 400 MHz |
|---|---|---|---|---|
| 60 | 1210 kHz | 2450 kHz | 4930 kHz | N.A |
| 120 | 1900 kHz | 2420 kHz | 4900 kHz | 9860 kHz |

For example, when SCS 60 kHz is used in a 50 MHz channel bandwidth, the minimum guardband may be 1210 kHz, and when SCS 120 kHz is used in a 50 MHz channel bandwidth, the minimum guard band may be 1900 kHz. Based on Table 7, it is possible to calculate Max.Rx BW when SCS 120 kHz is used in a 50 MHz channel bandwidth. In the previously described FR2 channel bandwidth−guardband*2, FR2 channel bandwidth of 50 MHz and minimum guardband of 1900 kHz can be applied. Since 50 MHz−

2*1900 kHz=46.2 MHz, Max.Rx BW is 46.2 MHz when SCS 120 kHz is used in 50 MHz channel bandwidth. 46.2 MHz may be applied to Max.Rx BW of Equation 4.

If Max.Rx BW is calculated when SCS 120 kHz is used in 100 MHz channel bandwidth in the same way, Max.Rx BW is 95.16 MHz. If Max.Rx BW is calculated when SCS 120 kHz is used in 200 MHz channel bandwidth, Max.Rx BW is 190.2 MHz. Calculating Max.Rx BW when SCS 120 kHz is used in 400 MHz channel bandwidth is 380.28 MHz.

In the operating band including 39 GHz, a little more noise may be applied compared to the operating band including 28 GHz. Therefore, the Noise Figure (NF) in the operating band including 39 GHz assumes 11 dB, which is 1 dB larger than the assumed NF value of 10 dB in the operating band including 28 GHz. That is, 11 dB is proposed as the Noise Figure (NF) value in the operating band including 39 GHz.

In the operating band including 39 GHz, it is assumed that the total antenna gain is 11 dB, the diversity gain is 0 dB, and the SNR is −1 dB. In the operating band including 39 GHz, the implementation loss is assumed to be 9.5 dB to 8.5 dB. Table 8 below is an example showing REFSENS when the implementation loss value is assumed to be 9.5 dB.

TABLE 8

| Parameter | Unit | Freq. Range 37-40 GHz | | | |
|---|---|---|---|---|---|
| Max. Rx BW (X) | MHz | 50 | 100 | 200 | 400 |
| Thermal noise (kTB/Hz) | dBm | −174 | −174 | −174 | −174 |
| $10\log_{10}$ (Max. Rx BW) | dB | 76.6 | 79.8 | 82.8 | 85.8 |
| Effective realized antenna array gain | dB | 11.0 | 11.0 | 11.0 | 11.0 |
| Diversity Gain | dB | 0 | 0 | 0 | 0 |
| SNR | dB | −1 | −1 | −1 | −1 |
| NF | dB | 11 | 11 | 11 | 11 |
| Total implementation loss | dB | 9.5 | 9.5 | 9.5 | 9.5 |
| REFSENS | dBm/ [X] MHz | −88.9 | −85.7 | −82.7 | −79.7 |

In Table 8, kTB/Hz may mean thermal noise power. Effective realized antenna array gain means the effectively realized antenna array gain, that is, the total antenna gain. Total implementation loss means total implementation loss. The values described with reference to Table 7 may be applied to Max. Rx Bw at $10 \log_{10}$ (Max. Rx BW). For example, Max. Rx BW of 50 MHz channel bandwidth is 46.2 MHz, and Max. Rx BW of 100 MHz channel bandwidth is 95.16 MHz, Max. Rx BW of 200 MHz channel bandwidth is 190.2 MHz, and Max. Rx BW of 400 MHz channel bandwidth may be 380.28 MHz. The calculated $10 \log_{10}$ (Max. Rx BW) value for each channel bandwidth may be rounded to two decimal places. For example, at 200 MHz channel bandwidth, $10 \log_{10}$ (Max. Rx BW) is calculated as $10*\log_{10}$ (190.2 MHz)=79.78. Rounding 79.78 to two decimal places gives 79.8. In the same way, $10 \log_{10}$ (Max. Rx BW) values of 50 MHz channel bandwidth, 100 MHz channel bandwidth, and 400 MHz channel bandwidth are determined. By substituting the parameters shown in the example of Table 8 into Equation 4, the REFSENS value of the last row of the example of Table 8 can be obtained.

For example, if the channel bandwidth is 50 MHz (eg Max.Rx BW is 46.2 MHz), −174+76.6+11−11−0−1+9.5=88.9 dBm/50 MHz, so REFSENS is −88.9 dBm.

In summary, assuming the implementation loss value is 9.5 dB, when the channel bandwidth is 50 MHz, REFSENS is −88.9 dBm. When the channel bandwidth is 100 MHz (eg Max.Rx BW is 95.16 MHz), REFSENS is −85.7 dBm. When the channel bandwidth is 200 MHz (eg Max.Rx BW is 190.2 MHz), REFSENS is −82.7 dBm. When the channel bandwidth is 400 MHz (eg Max.Rx BW is 380.28 MHz), REFSENS is −79.7 dBm.

In addition, the REFSEN value of another channel bandwidth may be determined based on the REFSENS value of the 50 MHz channel bandwidth. For example, the REFSENS value of the 100 MHz channel bandwidth may be determined by adding 3 dB to the REFSENS of the 50 MHz channel bandwidth. The REFSENS value of the 200 MHz channel bandwidth may be determined by adding 6 dB to the REFSENS of the 50 MHz channel bandwidth. The REFSENS value of the 400 MHz channel bandwidth may be determined by adding 9 dB to the REFSENS of the 50 MHz channel bandwidth.

As described above, the example in Table 8 is an example when the implementation loss value is assumed to be 9.5 dB.

Since the implementation loss value may be 9.5 dB to 8.5 dB, depending on the implementation loss value, when the channel bandwidth is 50 MHz, REFSENS may be −88.9 dBm to −89.9 dBm. When the channel bandwidth is 100 MHz, REFSENS may be −85.7 dBm to −86.7 dBm. When the channel bandwidth is 200 MHz, REFSENS may be −82.7 dBm to −83.7 dBm. When the channel bandwidth is 400 MHz, REFSENS may be −79.7 dBm to −80.7 dBm.

EIS may be determined in consideration of spherical coverage. The EIS determined in consideration of the spherical coverage may be a spherical coverage EIS. For example, EIS may be determined based on EIRP values corresponding to REFSENS, minimum peak EIRP, and spherical coverage 60%-tile CDF.

For example, the EIS may be determined by adding the difference between the minimum peak EIRP and the spherical coverage 60%-tile CDF (9 dB+3.5 dB=12.5 dB described in FIG. 7) to REFSENS. Specifically, EIS may be determined as in Equation 5.

$$EIS \text{ spherical coverage} = \text{REFSENS} + 12.5 \text{ dB (Difference (min Peak } EIRP, EIRP \text{ spherical coverage at 60\%–tile } CDF))$$ [Equation 5]

In Equation 5, Difference (min Peak EIRP, EIRP spherical coverage at 60%-tile CDF) means the difference between minimum peak EIRP and spherical coverage 60% -tile CDF.

Examples of EIS values determined according to Equation 5 are shown in Tables 9 and 10 below. Table 9 shows EIS values for a case where an implementation loss of 9.5 dB is assumed, and Table 10 shows EIS values for a case where an implementation loss of 8.5 dB is assumed.

TABLE 9

| Parameter | Unit | Freq. Range 37-40 GHz | | | |
|---|---|---|---|---|---|
| Max. Rx BW (X) | MHz | 50 | 100 | 200 | 400 |
| REFSENS | dBm/ [X] MHz | −88.9 | −85.7 | −82.7 | −79.7 |
| Difference (min Peak EIRP, EIRP spherical coverage at 60%-tile CDF)) | dB | 12.5 | 12.5 | 12.5 | 12.5 |
| Sensitivity EIS | dBm/ [X] MHz | −76.4 | −73.2 | −70.2 | −67.2 |

In Table 9, REFSENS represents REFSENS determined assuming an implementation loss of 9.5 dB. Difference (min Peak EIRP, EIRP spherical coverage at 60%-tile CDF) means the difference between minimum peak EIRP and spherical coverage 60%-tile CDF. Sensitivity EIS stands for spherical coverage EIS. For example, if the channel bandwidth is 100 MHz (eg, Max.Rx BW is 95.16 MHz), REFSENS according to the implementation loss of 9.5 dB may be −85.7. Since −85.9+12.5 is −73.2, the spherical EIS may be −73.2 dBm.

TABLE 10

| Parameter | Unit | Freq. Range 37-40 GHz | | | |
|---|---|---|---|---|---|
| Max. Rx BW (X) | MHz | 50 | 100 | 200 | 400 |
| REFSENS | dBm/[X] MHz | −89.9 | −86.7 | −83.7 | −80.7 |
| Difference (min Peak EIRP, EIRP spherical coverage at 60%-tile CDF)) | dB | 12.5 | 12.5 | 12.5 | 12.5 |
| Sensitivity EIS | dBm/[X] MHz | −77.4 | −74.2 | −71.2 | −68.2 |

In Table 10, REFSENS represents REFSENS determined assuming an implementation loss of 8.5 dB. Difference (min Peak EIRP, EIRP spherical coverage at 60%-tile CDF) means the difference between minimum peak EIRP and spherical coverage 60%-tile CDF. Sensitivity EIS stands for spherical coverage EIS. For example, when the channel bandwidth is 100 MHz (eg, Max.Rx BW is 95.16 MHz), REFSENS according to the implementation loss of 8.5 dB may be −86.7. Since −85.9+12.5 is −73.2, the spherical EIS may be −73.2 dBm.

An example that summarizes the requirements related to reception of a vehicular terminal performing communication in an operating band including 39 GHz is as follows.

REFSENS of the vehicular terminal of the operating band including 39 GHz may be as follows:

When the receiving channel bandwidth is 50 MHz (eg, Max.Rx BW is 46.2 MHz), REFSENS may be −89.9 dBm~−88.9 dBm. As an example, −88.9 dBm is suggested.

When the receiving channel bandwidth is 100 MHz (eg, Max.Rx BW is 95.16 MHz), REFSENS may be −86.7 dBm~−85.79 dBm. As an example, −85.7 dBm is suggested.

When the receiving channel bandwidth is 200 MHz (eg, Max.Rx BW is 190.2 MHz), REFSENS may be −83.7~−82.7 dBm. As an example, −82.7 dBm is suggested.

When the receiving channel bandwidth is 400 MHz (eg, Max.Rx BW is 380.28 MHz), REFSENS may be −80.7~−79.7 dBm. As an example, −79.7 dBm is proposed.

The spherical coverage EIS (EIS) of the vehicular terminal of the operating band including 39 GHz may be as follows:

When the reception channel bandwidth is 50 MHz (eg, Max.Rx BW is 46.2 MHz), EIS (spherical coverage EIS) may be −77.4 dBm to −76.4 dBm. As an example, −76.4 dBm is proposed.

When the receiving channel bandwidth is 100 MHz (eg, Max.Rx BW is 95.16 MHz), EIS (spherical coverage EIS) may be −74.2 dBm to −73.2 dBm. As an example, −73.2 dBm is suggested.

When the reception channel bandwidth is 200 MHz (eg, Max.Rx BW is 190.2 MHz), EIS (spherical coverage EIS) may be −71.2 dBm to −70.2 dBm. As an example, −70.2 dBm is suggested.

When the reception channel bandwidth is 400 MHz (eg, Max.Rx BW is 380.28 MHz), EIS (spherical coverage EIS) may be −68.2 dBm to −67.2 dBm. As an example, −67.2 dBm is proposed.

A vehicular terminal capable of performing communication in an operating band (eg, n260) including 39 GHz may satisfy the requirements related to reception.

For example, when a terminal receives a signal, a transceiver and/or a processor may be implemented to satisfy a requirement related to reception. For example, when the transceiver of the terminal receives a signal, the transceiver may be implemented to satisfy the requirements related to reception. As another example, when the processor of the terminal controls the transceiver of the terminal to receive a signal, the processor and the transceiver may be implemented to satisfy the requirements related to reception. Here, the signal received by the terminal may be a downlink signal transmitted from the base station. In addition, the signal received by the terminal may be a sidelink signal transmitted from another terminal.

REFSENS of a vehicular terminal capable of performing communication in an operating band (eg, n260) including 39 GHz may be as follows:

When the receiving channel bandwidth is 50 MHz, −89.9 dBm~−88.9 dBm

When the receiving channel bandwidth is 100 MHz, −86.7 dBm~−85.79 dBm

When the receiving channel bandwidth is 200 MHz, −83.7~−82.7 dBm

When the receiving channel bandwidth is 400 MHz, −80.7~−79.7 dBm

A spherical coverage EIS (EIS) of a vehicular terminal capable of performing communication in an operating band (eg, n260) including 39 GHz may be as follows:

When the receiving channel bandwidth is 50 MHz, −77.4 dBm~−76.4 dBm

When the receiving channel bandwidth is 100 MHz, −74.2 dBm~−73.2 dBm

When the receiving channel bandwidth is 200 MHz, −71.2 dBm~−70.2 dBm

When the receiving channel bandwidth is 400 MHz, −68.2 dBm~−67.2 dBm

III. Summary of the Disclosure of the Present Specification

A vehicular terminal capable of performing communication in an operating band (eg, n260) including 39 GHz may satisfy a requirement related to transmission power and/or a requirement related to reception.

For example, a vehicular terminal capable of performing communication in an operating band (eg, n260) including 39 GHz may satisfy a requirement related to transmission power. A vehicular terminal capable of performing communication in an operating band (eg, n260) including 39 GHz may satisfy the requirements related to reception. A vehicular terminal capable of performing communication in an operating band (eg, n260) including 39 GHz may satisfy requirements related to transmission power and requirements related to reception.

A vehicular terminal capable of performing communication in an operating band (eg, n260) including 39 GHz may transmit or receive a signal based on an operating band (eg, n260) including 39 GHz.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 8:
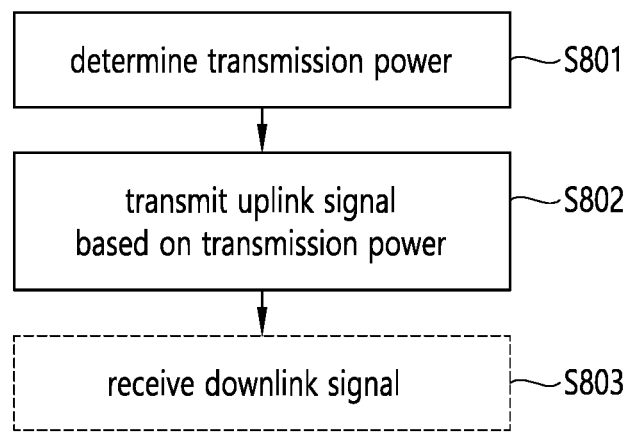
FIG. 8 is a first exemplary diagram illustrating an operation of a terminal according to the disclosure of the present specification.

FIG. 8 is a First Exemplary Diagram Illustrating an Operation of a Terminal According to the Disclosure of the Present Specification.

A vehicular terminal capable of performing communication in an operating band (eg, n260) including 39 GHz may perform the operation shown in FIG. 8.

In step S801, the terminal may determine the transmission power.

In step S802, the terminal may transmit an uplink signal based on the transmission power. For example, the terminal may transmit an uplink signal in an operating band including 39 GHz based on the transmission power. Transmission power of the terminal may satisfy a requirement related to transmission power. The requirement related to transmission power may be a requirement based on that the terminal is a vehicle terminal and that an uplink signal is transmitted in an operating band including 39 GHz.

The requirements related to transmit power may include at least one of a minimum peak EIRP, an EIRP related to spherical coverage (eg, EIRP at spherical coverage of 60%-tile CDF), a maximum TRP, and/or a maximum EIRP.

The minimum peak EIRP value may have a value between 25 dBm and 26 dBm. EIRP related to spherical coverage may be EIRP related to the $60^{th}$ percentile in the distribution of radiated power measured in a sphere around the terminal. The EIRP related to the 60th percentile may have a value between 12.5 dBm and 13.5 dBm.

In step S803, the terminal may receive a downlink signal. For example, the terminal may receive a downlink signal based on an operating band including 39 GHz. A reference sensitivity related to reception of a downlink signal may be predetermined based on a channel bandwidth. The EIS related to the reception of the downlink signal may be predetermined based on the channel bandwidth.

REFSENS of a vehicular terminal capable of performing communication in an operating band (eg, n260) including 39 GHz may be as follows:

When the receiving channel bandwidth is 50 MHz, −89.9 dBm~−88.9 dBm

When the receiving channel bandwidth is 100 MHz, −86.7 dBm~−85.79 dBm

When the receiving channel bandwidth is 200 MHz, −83.7~−82.7 dBm

When the receiving channel bandwidth is 400 MHz, −80.7~−79.7 dBm

A spherical coverage EIS (EIS) of a vehicular terminal capable of performing communication in an operating band (eg, n260) including 39 GHz may be as follows:

When the receiving channel bandwidth is 50 MHz, −77.4 dBm~−76.4 dBm

When the receiving channel bandwidth is 100 MHz, −74.2 dBm~−73.2 dBm

When the receiving channel bandwidth is 200 MHz, −71.2 dBm~−70.2 dBm

When the receiving channel bandwidth is 400 MHz, −68.2 dBm~−67.2 dBm

For reference, the terminal may omit performing the step (S803).

The following drawings were created to explain a specific example of the present specification. Since the names of specific devices described in the drawings or the names of specific signals/messages/fields are presented by way of example, the technical features of the present specification are not limited to the specific names used in the following drawings.

Figure 9:
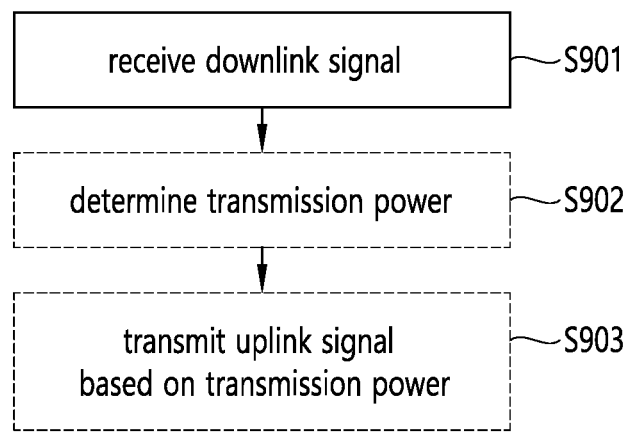
FIG. 9 is a first exemplary diagram illustrating an operation of a terminal according to the disclosure of the present specification.

FIG. 9 is a First Exemplary Diagram Illustrating an Operation of a Terminal According to the Disclosure of the Present Specification.

A vehicular terminal capable of performing communication in an operating band (eg, n260) including 39 GHz may perform the operation shown in FIG. 8.

In step S901, the terminal may receive a downlink signal. For example, the terminal may receive a downlink signal based on an operating band including 39 GHz. A reference sensitivity related to reception of a downlink signal may be predetermined based on a channel bandwidth. The EIS related to the reception of the downlink signal may be predetermined based on the channel bandwidth.

REFSENS of a vehicular terminal capable of performing communication in an operating band (eg, n260) including 39 GHz may be as follows:

When the receiving channel bandwidth is 50 MHz, −89.9 dBm~−88.9 dBm

When the receiving channel bandwidth is 100 MHz, −86.7 dBm~−85.79 dBm

When the receiving channel bandwidth is 200 MHz, −83.7~−82.7 dBm

When the receiving channel bandwidth is 400 MHz, −80.7~−79.7 dBm

A spherical coverage EIS (EIS) of a vehicular terminal capable of performing communication in an operating band (eg, n260) including 39 GHz may be as follows:

When the receiving channel bandwidth is 50 MHz, −77.4 dBm~−76.4 dBm

When the receiving channel bandwidth is 100 MHz, −74.2 dBm~−73.2 dBm

When the receiving channel bandwidth is 200 MHz, −71.2 dBm~−70.2 dBm

When the receiving channel bandwidth is 400 MHz, −68.2 dBm~−67.2 dBm

In step S902, the terminal may determine the transmission power.

In step S903, the terminal may transmit an uplink signal based on the transmission power. For example, the terminal may transmit an uplink signal in an operating band including 39 GHz based on the transmission power. Transmission power of the terminal may satisfy a requirement related to transmission power. The requirement related to transmission power may be a requirement based on that the terminal is a vehicle terminal and that an uplink signal is transmitted in an operating band including 39 GHz.

The requirements related to transmit power may include at least one of a minimum peak EIRP, an EIRP related to spherical coverage (eg, EIRP at spherical coverage of 60%-tile CDF), a maximum TRP, and/or a maximum EIRP.

The minimum peak EIRP value may have a value between 25 dBm and 26 dBm. EIRP related to spherical coverage may be EIRP related to the $60^{th}$ percentile in the distribution of radiated power measured in a sphere around the terminal. The EIRP related to the $60^{th}$ percentile may have a value between 12.5 dBm and 13.5 dBm.

For reference, the terminal may omit performing steps (S902) and (S903).

For reference, operations for transmitting an uplink signal and receiving a downlink signal by the terminal are disclosed in FIGS. 8 and 9 described above, but this is only an example. The contents described with reference to FIGS. 8 and 9 may also be applied when the terminal transmits a sidelink signal and receives a sidelink signal.

For reference, the operation of the terminal described in this specification may be implemented by the apparatus of FIGS. 10 to 15 to be described below. For example, the terminal may be the first wireless device 100 or the second wireless device 200 of FIG. 11. For example, the operation of a UE described herein may be handled by one or more processors 102 or 202. The operations of the UE described herein may be stored in one or more memories 104 or 204 in the form of instructions, executable code, executable by one or more processors 102 or 202. One or more processors 102 or 202 may control one or more memories 104 or 204 and one or more transceivers 106 or 206, and one or more processors 102 or 202 may perform the operation of the terminal described in the disclosure of the present specification by executing instructions/programs stored in one or more memories 104 or 204.

In addition, the instructions for performing the operation of the terminal described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal described in the disclosure of the present specification.

IV. Examples to which the Disclosure of this Specification is to be Applied

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 10:
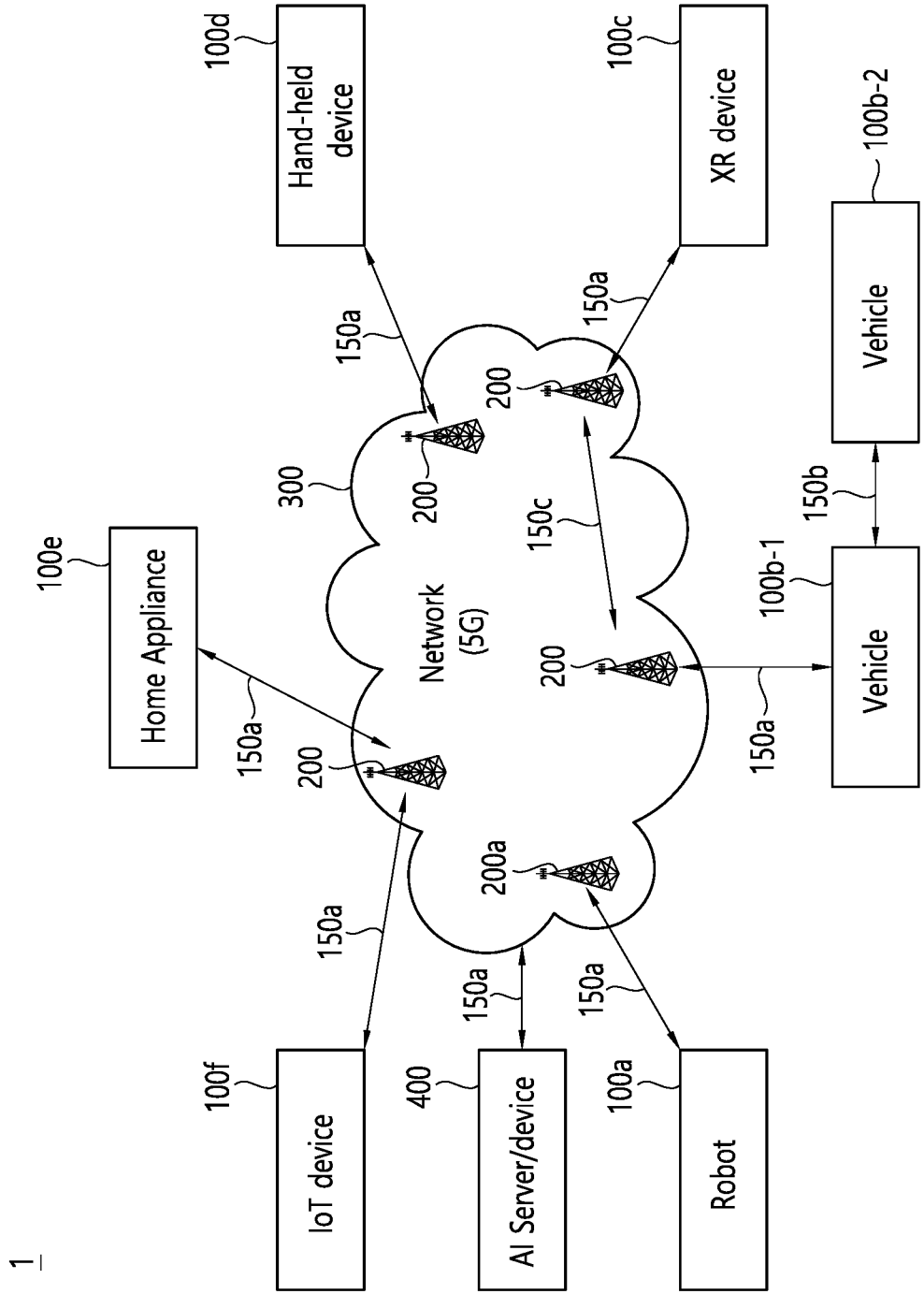
FIG. 10 illustrates a communication system 1 that can be applied to the present specification.

FIG. 10 Illustrates a Communication System 1 that can be Applied to the Present Specification.

Referring to FIG. 10, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like. Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like. The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/ base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like. The wireless device and the base station/wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

Figure 11:
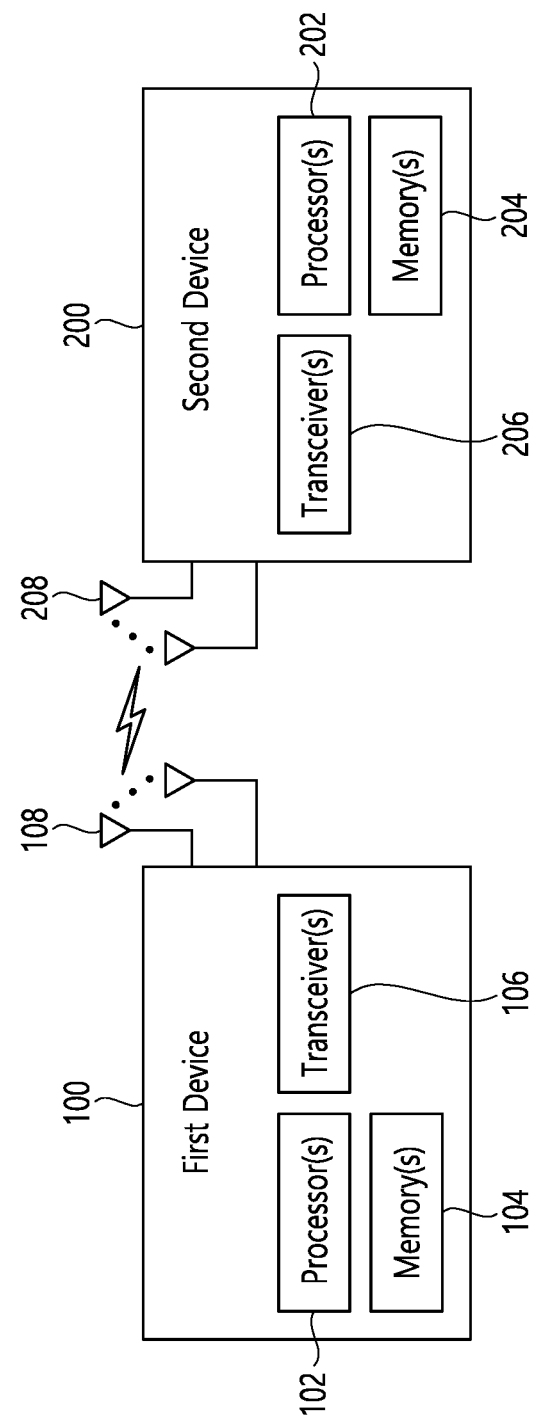
FIG. 11 illustrates an example of a wireless device that can be applied to the present specification.

FIG. 11 Illustrates an Example of a Wireless Device that can be Applied to the Present Specification.

Referring to FIG. 11, the first wireless device 100 and the second wireless device 200 may transmit and receive wireless signals through various wireless access technologies (e.g., LTE and NR). Here, the {first wireless device 100 and the second wireless device 200} may refer to the {wireless device 100x, the base station 200} and/or the {wireless device 100x, the wireless device 100x of FIG. 10}. Alternatively, the first wireless device 100 may correspond to the UE, AMF, SMF, or UPF described in the disclosure of the present specification. In addition, the second wireless device 200 may correspond to a UE, AMF, SMF, or UPF that communicates with the first wireless device 100. The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein. For example, the processor 102 may process the information in the memory 104 to generate a first information/signal, and then transmit the wireless signal including the first information/ signal through the transceiver 106. In addition, the processor 102 may receive the radio signal including a second information/signal through the transceiver 106 and store the information obtained from the signal processing of the second information/signal in the memory 104. The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein. Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204. The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein. Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto. For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein. One or more processors 102, 202 may generate messages, control information, data or information in accordance with the descriptions, functions, procedures, suggestions, methods and/or operational flowcharts disclosed herein. One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206. One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals. For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208. In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 12:
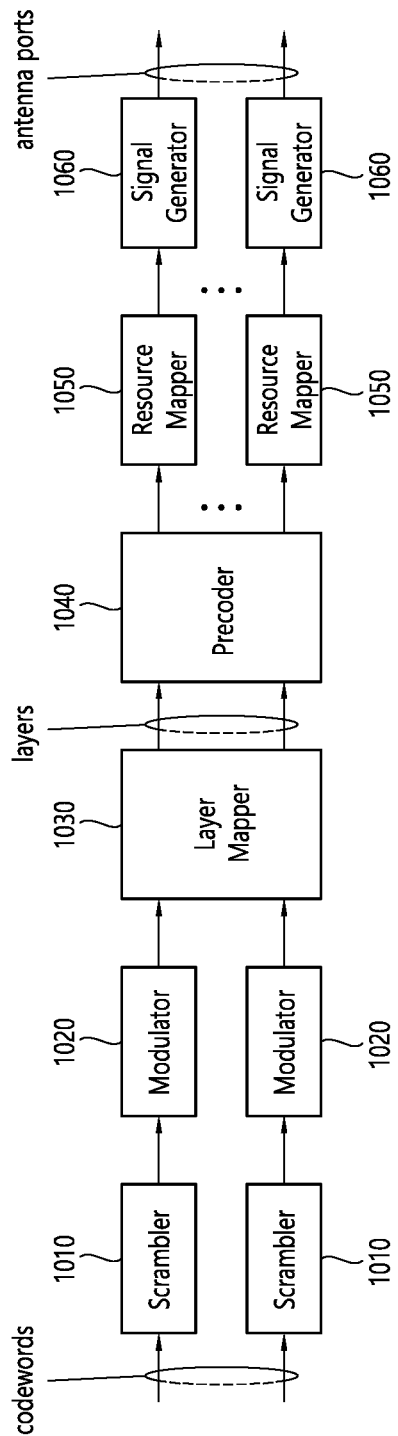
FIG. 12 illustrates an example of a signal processing circuit for a transmission signal.

FIG. 12 Illustrates an Example of a Signal Processing Circuit for a Transmission Signal.

Referring to FIG. 12, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 12 may be performed in the processor (102, 202), the memory (104, 204) and/or transceiver (106, 206) of FIG. 11. The hardware element of FIG. 12 may be implemented in the processors 102 and 202 and/or the transceivers 106 and 206 of FIG. 11. For example, blocks 1010-1060 may be implemented in the processors 102, 202 of FIG. 11. Also, blocks 1010-1050 may be implemented in the processors 102 and 202 of FIG. 11, and block 1060 may be implemented in the transceivers 106 and 206 of FIG. 11.

The codeword may be converted into a wireless signal through the signal processing circuit 1000 of FIG. 12. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like. The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010-1060 of FIG. 12. For example, a wireless device (e.g., 100 and 200 of FIG. 11) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a postcoder, a demodulator, a de-scrambler and a decoder.

Figure 13:
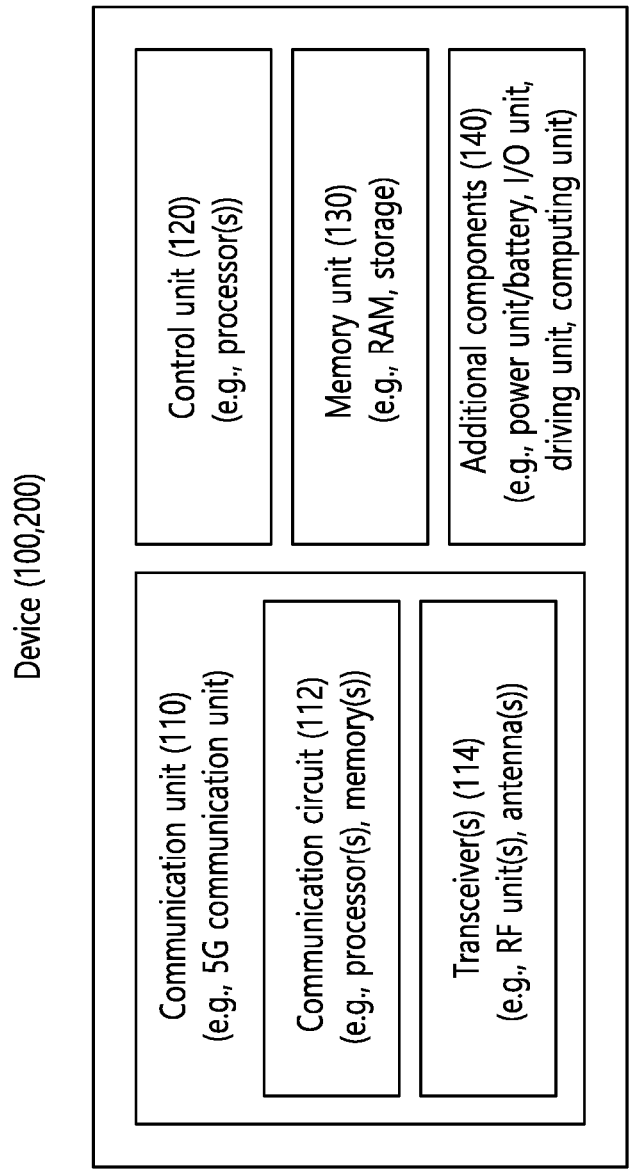
FIG. 13 illustrates another example of a wireless device that can be applied to the present specification.

FIG. 13 Illustrates Another Example of a Wireless Device that can be Applied to the Present Specification.

The wireless device may be implemented in various forms according to use-examples/services (refer to FIG. 10).

Referring to FIG. 13, the wireless devices 100 and 200 correspond to the wireless devices 100 and 200 of FIG. 11, and the wireless devices 100 and 200 may be configured with various elements, components, units, and/or modules. For example, the wireless device 100, 200 may include a communication unit 110, a control unit 120, a memory unit 130, and additional components 140. The communication unit may include communication circuit 112 and transceiver (s) 114. For example, the communication circuit 112 may include one or more processors 102, 202 and/or one or more memories 104, 204 of FIG. 11. For example, the transceiver (s) 114 may include one or more transceivers 106, 206 and/or one or more antennas 108, 208 of FIG. 11. The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130. In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 11. For example, the memory unit 130 may include one or more memories 104 and 204 of FIG. 11.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 10, 100a), a vehicle (FIG. 10, 100b-1, 100b-2), an XR device (FIG. 10, 100c), a portable device (FIG. 10, 100d), a home appliance. (FIG. 10, 100e), IoT devices (FIG. 10, 100f), terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 13, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Figure 14:
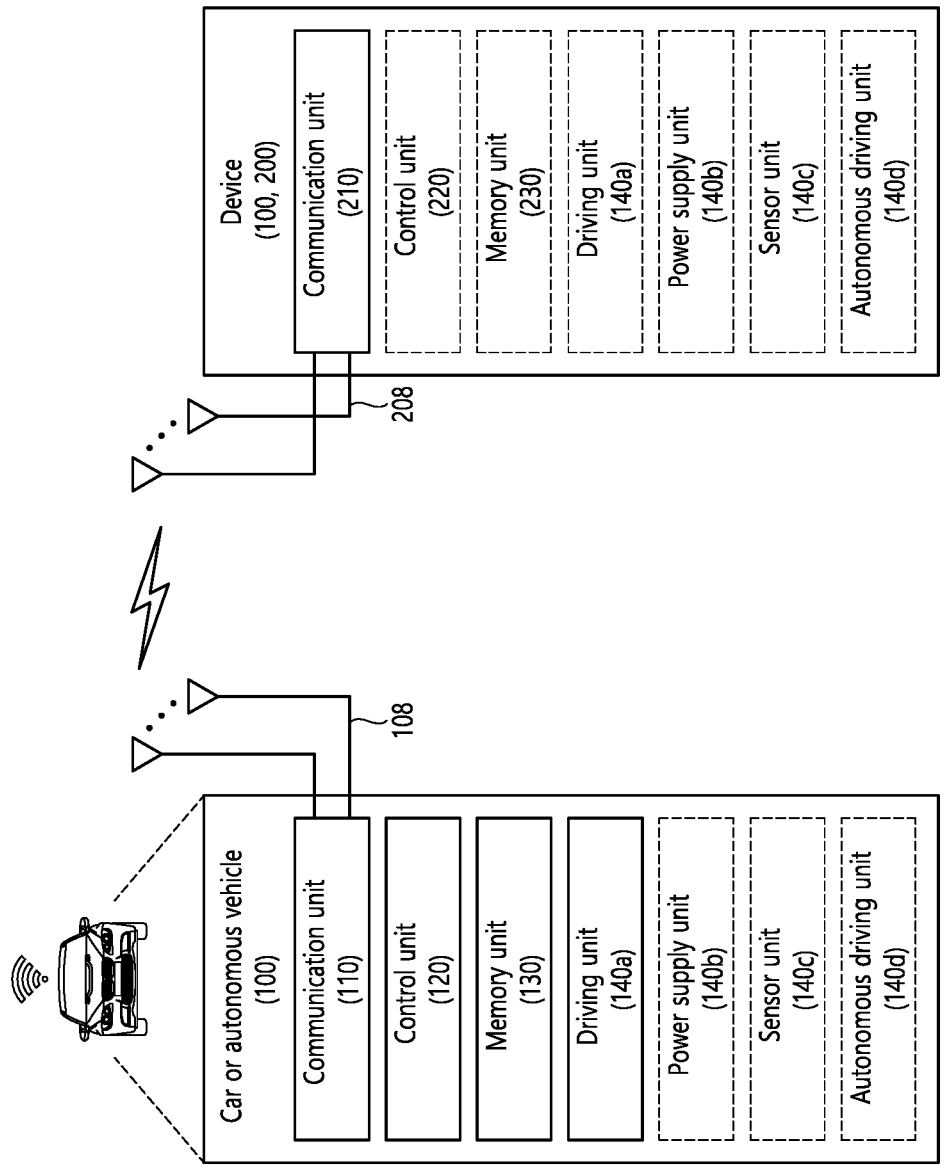
FIG. 14 illustrates an example of a vehicle or an autonomous vehicle that can be applied to the present specification.

FIG. 14 Illustrates an Example of a Vehicle or an Autonomous Vehicle that can be Applied to the Present Specification.

FIG. 14 illustrates a vehicle or autonomous vehicle applied to the disclosure of this specification. The vehicle or autonomous driving vehicle may be implemented as a mobile robot, a vehicle, a train, an aerial vehicle (AV), a ship, and the like.

Referring to FIG. 14, the vehicle or the autonomous vehicle 100 may include an antenna unit 108, a communication unit 110, a control unit 120, a driving unit 140a, a power supply unit 140b, a sensor unit 140c, and autonomous driving unit 140d. The antenna unit 108 may be configured as part of the communication unit 110. The blocks 110/130/140a to 140d may correspond to blocks 110/130/140 of FIG. 13, respectively.

The communication unit 110 may transmit or receive signals (e.g., data, control signals, etc.) with external devices, such as base stations (e.g. base stations, road side units, etc.), servers, and the like. The control unit 120 may control various elements of the vehicle or the autonomous vehicle 100 to perform various operations. The control unit 120 may include an ECU (Electronic Control Unit). The driving unit 140a may cause the vehicle or the autonomous vehicle 100 to drive on the ground. The driving unit 140a may include an engine, a motor, a power train, wheels, a brake, a steering device, and the like. The power supply unit 140b supplies power to the vehicle or the autonomous vehicle 100, and may include a wired/wireless charging circuit, a battery, and the like. The sensor unit 140c may obtain vehicle status, surrounding environment information, user information, and the like. The sensor unit 140c includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140d may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140d may generate an autonomous driving route and a driving plan based on the obtained data. The control unit 120 may control the driving unit 140a to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles. In addition, during autonomous driving, the sensor unit 140c may acquire vehicle state and surrounding environment information. The autonomous driving unit 140d may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 15:
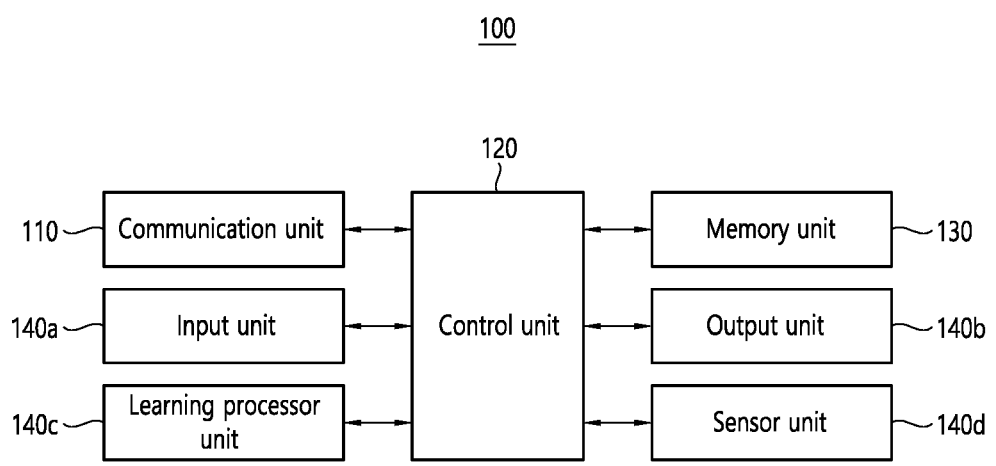
FIG. 15 illustrates an example of an AI device that can be applied to the disclosure of the present specification.

FIG. 15 Illustrates an Example of an AI Device that can be Applied to the Disclosure of the Present Specification.

FIG. 15 illustrates an example of an AI device applied to the disclosure of the present specification. An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 15, the AI device 100 includes a communication unit 110, a control unit 120, a memory unit 130, an input/output unit 140a/140b, a learning processor unit 140c, and a sensor unit 140d. Blocks 110 to 130/140a to 140d respectively correspond to blocks 110 to 130/140 of FIG. 13.

The communication unit 110 communicates may transmit or receive wired signals and wireless signals (e.g., sensor information, user input, learning model, control signal, etc.) with external devices such as another AI device (e.g., FIG. 1, 100x, 200, 400) or an AI server (e.g., 400 of FIG. 10) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm. In addition, the control unit 120 may control the components of the AI device 100 to perform the determined operation. For example, the control unit 120 may request, search, receive, or utilize data of the running processor 140c or the memory 130. The control unit 120 may control the components of the AI device 100 to execute a predicted or desirable operation among at least one executable operation. In addition, the control unit 120 collects history information including the operation contents of the AI device 100 or the user's feedback on the operation, and stores the information in the memory unit 130 or the running processor unit 140c or transmits the information to an external device such as an AI server (FIG. 10, 400). The collected historical information can be used to update the learning model.

The memory unit 130 may store data supporting various functions of the AI device 100. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary for operation/execution of the control unit 120.

The input unit 140a may obtain various types of data from the outside of the AI device 100. For example, the input unit 140a may acquire training data for model learning, input data to which the training model is applied, and the like. The input unit 140a may include a camera, a microphone, and/or a user input unit. The output unit 140b may generate an output related to sight, hearing, or touch. The output unit 140b may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140c may train a model composed of artificial neural networks using the training data. The learning processor unit 140c may perform AI processing together with the learning processor unit of the AI server (FIGS. 12 and 400). The learning processor unit 140c may process information received from an external device through the communication unit 110 and/or information stored in the memory unit 130. In addition, the output value of the learning processor unit 140c may be transmitted to the external device through the communication unit 110 and/or stored in the memory unit 130.

As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A User Equipment (UE) comprising:
at least one transceiver;
at least one memory for storing instructions; and
at least one processor operably electrically connectable to the at least one memory and the at least one transceiver,
wherein the instructions that, based on being executed by the at least one processor, perform operations comprising:
transmitting an uplink signal in an operating band related to 39 GHz based on a transmission power;
receiving a downlink signal in the operating band related to 39 GHz,
wherein the UE is configured to satisfy a requirement related to the transmission power,
wherein the requirement related to the transmission power is based on that the UE is a power class 2 UE and that the uplink signal is transmitted in the operating band related to 39 GHZ,
wherein the requirement related to the transmission power includes a minimum peak Effective Isotropic Radiated Power (EIRP), and an EIRP related to spherical coverage,
wherein the minimum peak EIRP is 25 dBm for the operating band related to 39 GHz, based on that the UE is the power class 2 UE, and
wherein the EIRP related to the spherical coverage is a minimum EIRP at a 60th percentile in a distribution of radiated power measured in a full sphere around the UE, the minimum EIRP at 60th percentile being 12.5 dBm for the operating band related to 39 GHZ, based on that the UE is the power class 2 UE.

2. The UE of claim 1, wherein a reference sensitivity (REFSENS) related to reception of the downlink signal is predetermined based on a channel bandwidth.

3. The UE of claim 2, wherein
for a channel bandwidth being 100 MHz, the REFSENS is −85.7 dBm for the operating band related to 39 GHz, based on that the UE is the power class 2 UE,
for a channel bandwidth being 200 MHz, the REFSENS is −82.7 dBm for the operating band related to 39 GHz, based on that the UE is the power class 2 UE, and
for a channel bandwidth being 400 MHz, the REFSENS is −79.7 dBm for the operating band related to 39 GHz, based on that the UE is the power class 2 UE.

4. The UE of claim 1, wherein the UE is configured to satisfy a requirement related to an equivalent isotropic sensitivity (EIS).

5. The UE of claim 4, wherein
for a channel bandwidth being 50 MHz, the EIS is −77.2 dBm for the operating band related to 39 GHz, based on that the UE is the power class 2 UE,
for a channel bandwidth being 100 MHz, the EIS is −74.2 dBm for the operating band related to 39 GHz, based on that the UE is the power class 2 UE,
for a channel bandwidth being 200 MHz, the EIS is −71.2 dBm for the operating band related to 39 GHz, based on that the UE is the power class 2 UE, and
for a channel bandwidth being 400 MHz, the EIS is −68.2 dBm for the operating band related to 39 GHz, based on that the UE is the power class 2 UE.

6. The UE of claim 4, wherein
for a channel bandwidth being 100 MHz, the EIS is −73.2 dBm for the operating band related to 39 GHz, based on that the UE is the power class 2 UE, for a channel bandwidth being 200 MHz, the EIS is −70.2 dBm for the operating band related to 39 GHz, based on that the UE is the power class 2 UE, and for a channel bandwidth being 400 MHZ, the EIS is −67.2 dBm for the operating band related to 39 GHz, based on that the UE is the power class 2 UE.

7. A wireless communication device comprising:
at least one transceiver;
at least one memory for storing instructions; and
at least one processor operably electrically connectable to the at least one memory and the at least one transceiver,
wherein the instructions that, based on being executed by the at least one processor, perform operations comprising:
transmitting an uplink signal in an operating band related to 39 GHz based on a transmission power; and
receiving the downlink signal in an operating band related to 39 GHz,
wherein the UE is configured to satisfy a requirement related to a reference sensitivity (REFSENS) and a requirement related to an equivalent isotropic sensitivity (EIS), and
wherein:
for a channel bandwidth being 100 MHz, the REFSENS is −85.7 dBm for the operating band related to 39 GHz, based on that the UE is the power class 2 UE,
for a channel bandwidth being 200 MHz, the REFSENS is −82.7 dBm for the operating band related to 39 GHz, based on that the UE is the power class 2 UE, and
for a channel bandwidth being 400 MHz, the REFSENS is −79.7 dBm for the operating band related to 39 GHz, based on that the UE is the power class 2 UE.

8. The UE of claim 7, wherein
for a channel bandwidth being 100 MHz, the EIS is −73.2 dBm for the operating band related to 39 GHz, based on that the UE is the power class 2 UE,
for a channel bandwidth being 200 MHZ, the EIS is −70.2 dBm for the operating band related to 39 GHz, based on that the UE is the power class 2 UE, and
for a channel bandwidth being 400 MHz, the EIS is −67.2 dBm for the operating band related to 39 GHz, based on that the UE is the power class 2 UE.

9. The UE of claim 7,
wherein the requirements related to the transmission power include a minimum peak Effective Isotropic Radiated Power (EIRP), and an EIRP related to spherical coverage,
wherein the minimum peak EIRP is 25 dBm for the operating band related to 39 GHz, based on that the UE is the power class 2 UE, and
wherein the EIRP related to the spherical coverage is a minimum EIRP at 60th percentile in a distribution of radiated power measured in a full sphere around the UE, the minimum EIRP at 60th percentile being 12.5 dBm for the operating band related to 39 GHz, based on that the UE is the power class 2 UE.

10. A User Equipment (UE) comprising:
at least one transceiver;
at least one memory for storing instructions; and
at least one processor operably electrically connectable to the at least one memory and the at least one transceiver,
wherein the instructions that, based on being executed by the at least one processor, perform operations comprising:
transmitting an uplink signal in an operating band related to 39 GHz based on a transmission power;
receiving a downlink signal in the operating band related to 39 GHz,
wherein the UE is configured to satisfy a requirement related to the transmission power,
wherein the requirement related to the transmission power is based on that the UE is a power class 2 UE and that the uplink signal is transmitted in an operating band related to 39 GHz, and
wherein the requirements related to the transmission power include a minimum peak Effective Isotropic Radiated Power (EIRP), and an EIRP related to spherical coverage,
wherein the minimum peak EIRP is 26 dBm for the operating band related to 39 GHz, based on that the UE is the power class 2 UE, and
wherein the EIRP related to the spherical coverage is a minimum EIRP at 60th percentile in a distribution of radiated power measured in a full sphere around the UE, the minimum EIRP at 60th percentile being 13.5 dBm for the operating band related to 39 GHz, based on that the UE is the power class 2 UE.

11. The UE of claim 10, wherein the UE is configured to satisfy a requirement related to a reference sensitivity (REFSENS).

12. The UE of claim 11, wherein
for a channel bandwidth being 50 MHz, the REFSENS is −89.7 dBm for the operating band related to 39 GHz, based on that the UE is the power class 2 UE,
for a channel bandwidth being 100 MHz, the REFSENS is −86.7 dBm for the operating band related to 39 GHz, based on that the UE is the power class 2 UE,
for a channel bandwidth being 200 MHz, the REFSENS is −83.7 dBm for the operating band related to 39 GHz, based on that the UE is the power class 2 UE, and
for a channel bandwidth being 400 MHz, the REFSENS is −80.7 dBm for the operating band related to 39 GHz, based on that the UE is the power class 2 UE.

13. The UE of claim 10,
wherein the UE is configured to satisfy a requirement related to an equivalent isotropic sensitivity (EIS).

* * * * *